United States Patent
Kim et al.

(10) Patent No.: US 9,813,206 B2
(45) Date of Patent: *Nov. 7, 2017

(54) METHOD AND APPARATUS SUPPORTING IMPROVED WIDE BANDWIDTH TRANSMISSIONS

(71) Applicant: QUALCOMM Incorporated, San Diego, CA (US)

(72) Inventors: Youhan Kim, Fremont, CA (US); Ning Zhang, Saratoga, CA (US)

(73) Assignee: QUALCOMM Incorporated, San Diego, CA (US)

(*) Notice: Subject to any disclaimer, the term of this patent is extended or adjusted under 35 U.S.C. 154(b) by 82 days.

This patent is subject to a terminal disclaimer.

(21) Appl. No.: 14/846,529

(22) Filed: Sep. 4, 2015

(65) Prior Publication Data

US 2015/0381329 A1    Dec. 31, 2015

Related U.S. Application Data

(63) Continuation of application No. 13/402,827, filed on Feb. 22, 2012, now Pat. No. 9,160,503.

(Continued)

(51) Int. Cl.
*H04B 1/16*    (2006.01)
*H04L 5/00*    (2006.01)
(Continued)

(52) U.S. Cl.
CPC ............ *H04L 5/0044* (2013.01); *H04B 1/16* (2013.01); *H04B 7/0413* (2013.01);
(Continued)

(58) Field of Classification Search
CPC ..................................................... H04B 1/005
See application file for complete search history.

(56) References Cited

U.S. PATENT DOCUMENTS 6,987,754 B2    1/2006    Shahar et al.
7,183,860 B2    2/2007    Staszewski et al.
(Continued)

FOREIGN PATENT DOCUMENTS

CN    101965019 A    2/2011
JP    H11225124 A    8/1999
(Continued)

OTHER PUBLICATIONS

Benko, et al., "Multi-channel Transmissions," doc.: IEEE 802.11-09/1022r0, Sep. 2009, PowerPoint Slides 1-13.
(Continued)

*Primary Examiner* — Andrew Lai
*Assistant Examiner* — Chuong M Nguyen
(74) *Attorney, Agent, or Firm* — Paradice and Li LLP

(57) ABSTRACT

A method for transmitting information in a wireless system is provided. In this method, the traffic on a plurality of channels can be determined. A bandwidth for a packet can be selected based on the traffic and available channel bandwidths. A modulation and a coding rate can be selected from a plurality of modulations and associated coding rates. The modulation and coding rate can be applied to a segment of the packet, wherein each segment includes one or more bandwidth units. The packet including the selected modulation and coding rate therein can be transmitted on at least one channel

40 Claims, 19 Drawing Sheets

Related U.S. Application Data

(60) Provisional application No. 61/449,449, filed on Mar. 4, 2011, provisional application No. 61/485,525, filed on May 12, 2011.

(51) Int. Cl.

| | | |
|---|---|---|
| *H04L 1/00* | (2006.01) | |
| *H04L 1/06* | (2006.01) | |
| *H04B 7/0413* | (2017.01) | |
| *H04W 24/02* | (2009.01) | |
| *H04L 27/00* | (2006.01) | |
| *H04L 27/34* | (2006.01) | |

(52) U.S. Cl.
CPC .......... *H04L 1/0003* (2013.01); *H04L 1/0009* (2013.01); *H04L 1/0028* (2013.01); *H04L 1/06* (2013.01); *H04L 5/001* (2013.01); *H04W 24/02* (2013.01); *H04L 5/0053* (2013.01); *H04L 5/0091* (2013.01); *H04L 27/0006* (2013.01); *H04L 27/34* (2013.01); *H04L 2001/0092* (2013.01)

(56) References Cited

U.S. PATENT DOCUMENTS

| | | | |
|---|---|---|---|
| 8,395,997 | B2 | 3/2013 | Banerjea et al. |
| 8,417,253 | B2 | 4/2013 | Gong |
| 9,160,503 | B2* | 10/2015 | Kim ................ H04L 1/0003 |
| 2003/0203743 | A1* | 10/2003 | Sugar ................ H04B 1/005 |
| | | | 455/550.1 |
| 2009/0274073 | A1 | 11/2009 | Sutton |
| 2010/0027689 | A1 | 2/2010 | Kohlmann |
| 2010/0061326 | A1 | 3/2010 | Lee et al. |
| 2010/0067367 | A1 | 3/2010 | Choi et al. |
| 2010/0118924 | A1* | 5/2010 | Pal ................ H04B 1/0039 |
| | | | 375/219 |
| 2011/0026623 | A1* | 2/2011 | Srinivasa ............ H04L 1/0016 |
| | | | 375/260 |
| 2011/0103280 | A1 | 5/2011 | Liu et al. |
| 2011/0105068 | A1* | 5/2011 | Reddy ............ H04B 1/0014 |
| | | | 455/207 |
| 2011/0110348 | A1 | 5/2011 | Lee et al. |
| 2011/0110467 | A1* | 5/2011 | Maltsev ............ H04B 1/005 |
| | | | 375/340 |
| 2011/0128929 | A1 | 6/2011 | Liu et al. |
| 2011/0188598 | A1 | 8/2011 | Lee et al. |
| 2011/0211489 | A1 | 9/2011 | Chung et al. |
| 2011/0222490 | A1 | 9/2011 | Fischer et al. |
| 2011/0292919 | A1 | 12/2011 | Trainin et al. |
| 2012/0052894 | A1 | 3/2012 | Manssour et al. |
| 2012/0069746 | A1 | 3/2012 | Park |
| 2012/0163292 | A1 | 6/2012 | Kneckt et al. |
| 2012/0207097 | A1 | 8/2012 | Lee et al. |
| 2012/0224612 | A1 | 9/2012 | Kim et al. |
| 2012/0314673 | A1* | 12/2012 | Noh ................ H04L 5/001 |
| | | | 370/329 |

FOREIGN PATENT DOCUMENTS

| | | |
|---|---|---|
| JP | 2002319917 A | 10/2002 |
| JP | 2010516152 A | 5/2010 |
| JP | 2011182391 A | 9/2011 |
| JP | 2012533208 A | 12/2012 |
| JP | 2013501413 A | 1/2013 |
| WO | 2010076042 A1 | 7/2010 |
| WO | 2011005061 A2 | 1/2011 |
| WO | 2011014685 A2 | 2/2011 |

OTHER PUBLICATIONS

European Search Report—EP14167539—Search Authority—The Hague—Jun. 13, 2014.
Hiramatsu, et al., "Technology Evolutions in LTE/LTE-Advanced and Its Applications," IEEE International Conference on Communication Systems (ICCS), 2010, XP031848284, pp. 161-165.
International Search Report and Written Opinion—PCT/US2012/026651—ISA/EPO—Oct. 17, 2012.
Kim Y. et al., "160 MHz Transmissions", IEEE 802.11-10/0774r0, Jul. 12, 2010, URL: https://mentor.ieee.org/802.11/dcn/10/11-10-0774-00-00ac-160-mhz-transmissions.ppt.
Redieteab G et al: "Cross-layer multichannel aggregation for future WLAN systems", IEEE International Conference on Communication Systems—ICCS 2010, Nov. 17, 2010 (Nov. 17, 2010) , pp. 740-745, XP031848376.
Stacey et al., "Specification Framework for TGac", IEEE P802.11, Wireless LANs, IEEE TGac, doc: IEEE 802.11-09/0992r21, Jan. 2011 (Jan. 19, 2011), pp. 1-50.

\* cited by examiner

| Case | BW | Bit Map | BWU 2 | BWU 1 | BWU 3 | BWU 4 |
|---|---|---|---|---|---|---|
| 1 | 20 MHz | "0123" | | P20 | | |
| 2 | 40 Mhz | "0000" | 0 | 0 | 0 | 0 |
| 3 | 80 MHz | "1000" | 0 | 1 | 0 | 0 |
| 4 | 80 MHz | "1100" | 1 | 1 | 0 | 0 |
| 5 | 160 MHz | "1010" | 0 | 1 | 1 | 0 |
| | | "1111" | 1 | 1 | 1 | 1 |

FIG. 6A

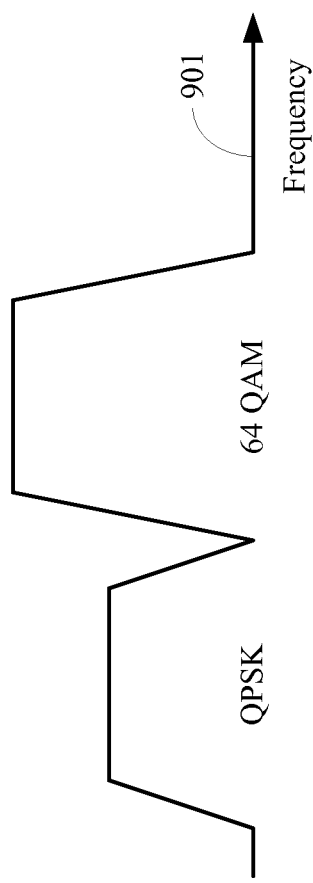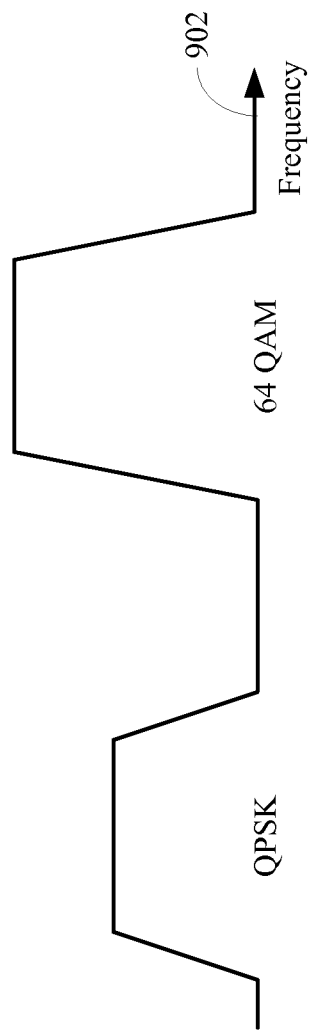

920

Determine traffic on a
plurality of channels
921

Select bandwidth for packet
based on the traffic and
available channel bandwidths
922

Select modulation and coding
rate from a plurality of
modulations and associated
coding rates
923

Transmit packet on at
least one channel
924

Segment 1

Segment 2

METHOD AND APPARATUS SUPPORTING IMPROVED WIDE BANDWIDTH TRANSMISSIONS

RELATED APPLICATIONS

This application is a continuation of U.S. patent application Ser. No. 13/402,827 entitled "Method And Apparatus Supporting Improved Wide Bandwidth Transmissions" filed Feb. 22, 2012 which claims priority to U.S. Provisional Patent Application Ser. No. 61/449,449 entitled "Mechanisms To Support Dynamic Bandwidth Selection And Non-contiguous Transmissions" filed Mar. 4, 2011 and U.S. Provisional Patent Application Ser. No. 61/485,525 entitled "Mechanisms To Support Dynamic Bandwidth Selection And Noncontiguous Transmissions" filed May 12, 2011.

BACKGROUND OF THE INVENTION

Field of the Invention

The present specification is directed to improving the performance of a wireless communication system and in particular to a wireless local area network (WLAN) that can dynamically select and utilize wide channel bandwidths.

Related Art

The performance of wireless local area networks (WLANs) is constantly being reviewed and enhanced to accommodate and/or anticipate new user applications. Much of this activity is driven by the IEEE 802.11 standards organization. This organization has developed a number of standards for the 2.4 GHz frequency band, including IEEE 802.11 (DSSS (direct sequence spread spectrum), 1-2 Mbps), IEEE 802.11b (CCK (complementary code keying), 11 Mbps), and IEEE.11g (OFDM (orthogonal frequency division multiplexing), 54 Mbps). The latest standard is IEEE 802.11n (MIMO-OFDM (multiple input multiple output OFDM), 600 Mbps), which supports both the 2.4 GHz and 5 GHz frequency bands.

In furtherance of this progress, the industry now seeks to improve the throughput performance of WLANs to exceed 1 Gbps. Therefore, a need arises for methods and apparatus that may allow the performance of WLAN systems to achieve this performance objective.

SUMMARY OF THE INVENTION

A method for transmitting information in a wireless system is provided. In this method, the traffic on a plurality of channels can be determined. A bandwidth for a packet can be selected based on the traffic and available channel bandwidths. A modulation and a coding rate can be selected from a plurality of modulations and associated coding rates. The modulation and coding rate can be applied to a segment of the packet, wherein each segment includes one or more bandwidth units. The packet including the selected modulation and coding rate therein can be transmitted on at least one channel.

The method can further include adjusting the selected modulation and coding rate, as necessary, on a per packet basis. The bandwidth of the packet can be provided on a contiguous or a non-contiguous spectrum. When the bandwidth of the packet is provided on a non-contiguous spectrum, the method can further include correlating phases of any synthesizers, and positioning two segments of the packet adjacent to each other on a waveform for transmission.

In one embodiment, at least one bandwidth unit is 40 MHz and the packet has a maximum of four bandwidth units. One bandwidth unit, provided on a primary channel, can include a symbol specifying the selected modulation and coding rate. Note that unequal bandwidths in the bandwidth units can be used. A bit map that specifies whether each bandwidth unit is used in the packet can be provided. Notably, an order of the bandwidth units in the bit map can be independent from actual transmission of the bandwidth units. In one embodiment, the method can further include providing information regarding a predetermined number of subsequent, sequentially transmitted packets having the selected modulation and coding rate in a data field of the packet.

A method for transmitting bitmap information in a wireless system is also provided. In this method, the traffic on a plurality of channels can be determined. A bandwidth for a packet can be selected based on the traffic and available channel bandwidths. The bandwidth can be dividable into a maximum allowed number of bandwidth units. A bitmap that indicates whether each bandwidth unit is used can be generated. The packet including the bitmap can be transmitted on at least one channel. Notably, an order of the bandwidth units in the bit map can be independent from actual transmission of the bandwidth units.

A wireless device is also provided, wherein the wireless device includes a transmitter configured to perform the above-described steps. A wireless system including first and second transceivers is provided. Notably, the wireless system can also include switches for selectively configuring the first and second transceivers for one of non-contiguous frequency operation and multiple-input multiple-output (MIMO) operation.

A method of transmitting a packet from a transmitter configured for at least non-contiguous frequency operation to a known receiver configured for only contiguous frequency operation is provided. In this method, phases of any synthesizers in the transmitter can be correlated. Then, any segments of the packet can be positioned adjacent to each other on a waveform. At this point, the waveform can be transmitted to the receiver.

BRIEF DESCRIPTION OF THE DRAWINGS

FIG. 6A illustrates an exemplary bit map table showing five bandwidth unit configurations for contiguous or non-contiguous transmissions.

FIGS. 9A and 9B respectively illustrate a contiguous transmission including multiple modulations and coding rates, and a non-contiguous transmission including the same modulations and coding rates.

DETAILED DESCRIPTION OF THE DRAWINGS

Currently, a new IEEE 802.11 standard is being developed. This standard, which will be designated as 802.11ac, has an objective to improve the throughput performance beyond the 802.11n standard, i.e. to exceed 1 Gbps. The Draft D0.1 of 802.11ac uses specific terminology, which will also be used herein for ease of reference. Exemplary terms are defined below.

"Frequency spectrum" generally refers to the entire frequency spectrum that may be required to support the transmission of a packet. The frequency spectrum may comprise one or more frequency segments (see below).

"Packet" refers to data in the frequency spectrum at any point in time.

"Bandwidth unit (BWU)", in proposed 802.11ac, refers to 40 MHz of frequency spectrum. A packet may have up to 4 BWUs, which are designated BWU 1, BWU 2, BWU 3, and BWU 4.

"Slot" refers to a designated frequency spectrum within a BWU. A BWU of 40 MHz may have two slots of 20 MHz. The primary channel (20 MHz) and the secondary channel (20 MHz) use the two slots in BWU 1.

"Segment" refers to a set of one or more BWUs. If there is no gap in frequency between the two BWUs, then the two BWUs are part of one segment. If there is a gap in frequency between the two BWUs, then each BWU is a segment. In proposed 802.11ac, a maximum of two segments per packet is allowed.

The broad objective for proposed 802.11ac includes ensuring Very High Throughput (VHT) (<6 GHz) by utilizing wide channel bandwidths (BW) (80 or 160 MHz) and multi-user, multiple input, multiple output (MU-MIMO) antennas. Another objective includes backward compatibility with 802.11a and 802.11n systems that operate at 5 GHz. Yet another objective includes the following target MAC throughput: single user throughput >500 Mbps and multi-user aggregate throughput >1 Gbps.

Figure 1A:
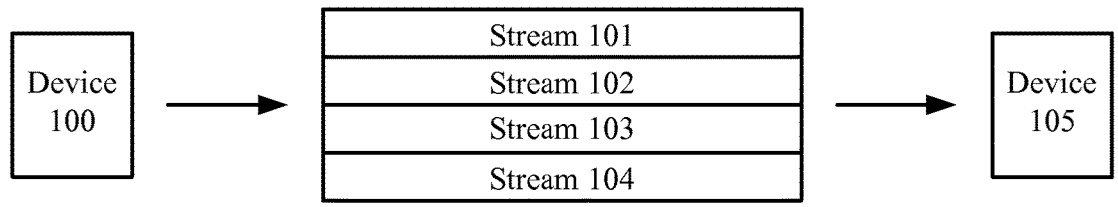
FIGS. 1A and 1B illustrate exemplary single-user MIMO (802.11n) and multi-user MIMO (proposed 802.11ac) transmissions, respectively.
Figure 1B:
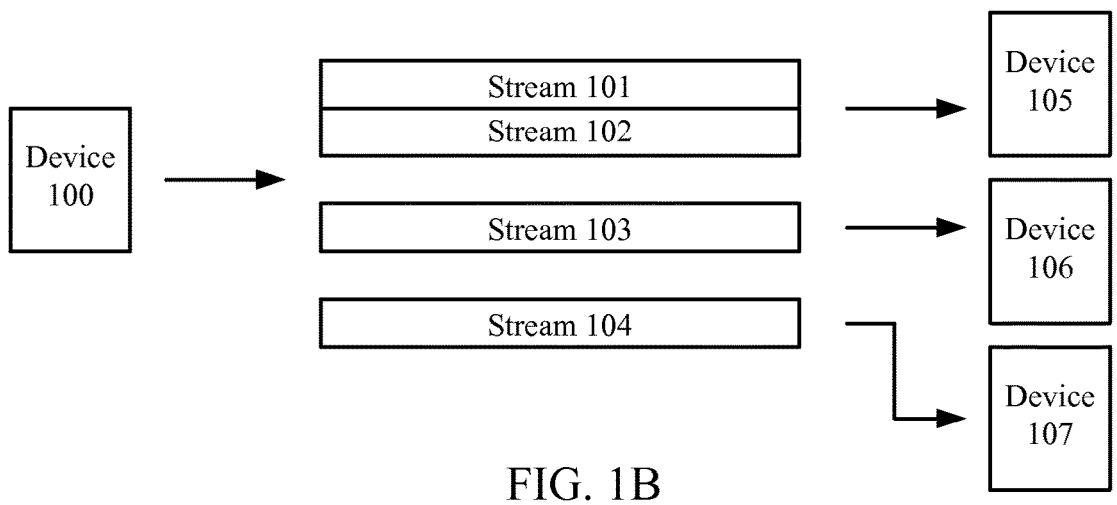

FIGS. 1A and 1B illustrate exemplary single-user MIMO (802.11n) and multi-user MIMO (proposed 802.11ac) transmissions, respectively. As shown in FIG. 1A, in the single-user MIMO transmission, a device 100 (e.g. an access point (AP)) can transmit multiple streams of data (i.e. streams 101, 102, 103, and 104) to a single device 105 (e.g. a station (STA)). In contrast, as shown in FIG. 1B, in the multi-user MIMO transmission), device 100 can transmit streams of data to multiple devices, such as devices 105, 106, and 107. In this embodiment, device 105 can receive streams 101 and 102, whereas devices 106 and 107 can receive streams 103 and 104, respectively. This transmission targeting capability may allow device 100 to maintain high total downlink throughput even when communicating with simple (and inexpensive) devices.

In previous WLAN standards, bandwidths were limited to 20 MHz and 40 MHz. In contrast, with the proposed 802.11ac standard, higher throughput may be achieved with bandwidth modes of 80 MHz and 160 MHz. Table 1 describes various options for the number of streams, the type of QAM modulation and associated coding rates (Modulation and Coding Scheme (MCS)), and bandwidth selections. The options listed in Table 1 may achieve a TCP/IP (Transmission Control Protocol/Internet Protocol) throughput greater than 1 GHz.

TABLE 1

| # STREAMS | MCS | BW |
|---|---|---|
| 8 | 256-QAM 3/4 | 40 MHz |
| 4 | 256-QAM 3/4 | 80 MHz |
| 3 | 64-QAM 2/3 | 160 MHz |
| 2 | 256-QAM 3/4 | 160 MHz |

Table 2 indicates the potential data rates (in Mbps) for a variety of MCSs and for 1 and 3 streams (wherein Nss refers to the number of spatial streams or streams).

TABLE 2

|  | Nss = 1 | | | Nss = 3 | | |
| --- | --- | --- | --- | --- | --- | --- |
| MCS | 40 MHz | 80 MHz | 160 MHz | 40 MHz | 80 MHz | 160 MHz |
| BPSK 1/2 | 15.0 | 32.5 | 65.0 | 45.0 | 97.5 | 195.0 |
| QPSK 1/2 | 30.0 | 65.0 | 130.0 | 90.0 | 195.0 | 390.0 |
| QPSK 3/4 | 45.0 | 97.5 | 195.0 | 135.0 | 292.5 | 585.0 |
| 16-QAM 1/2 | 60.0 | 130.0 | 260.0 | 180.0 | 390.0 | 780.0 |
| 16-QAM 3/4 | 90.0 | 195.0 | 390.0 | 270.0 | 585.0 | 1170.0 |
| 64-QAM 2/3 | 120.0 | 260.0 | 520.0 | 360.0 | 780.0 | 1560.0 |
| 64-QAM 3/4 | 135.0 | 292.5 | 585.0 | 405.0 | — | 1755.0 |
| 64-QAM 5/6 | 150.0 | 325.0 | 650.0 | 450.0 | 975.0 | 1950.0 |
| 256-QAM 3/4 | 180.0 | 390.0 | 780.0 | 540.0 | 1170.0 | 2340.0 |
| 256-QAM 5/6 | 200.0 | 433.3 | 866.7 | 600.0 | 1300.0 | — |

Figure 2A:
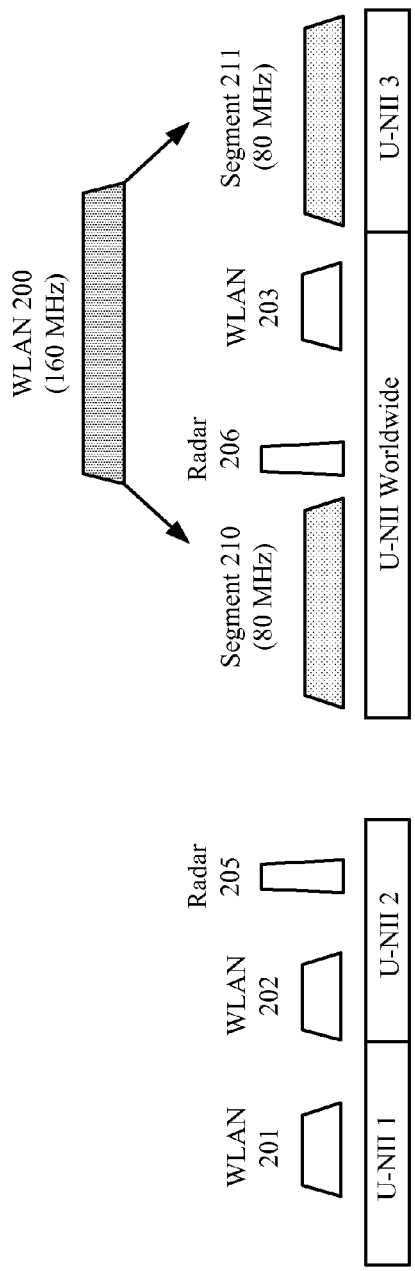
FIG. 2A illustrates a crowded frequency spectrum and a non-contiguous bandwidth operation for that spectrum.

As bandwidth increases, it becomes more difficult to locate a contiguous frequency spectrum available for higher bandwidth applications. For example, the frequency spectrum may be divided into slices that do not easily accommodate wide bandwidth transmissions. FIG. 2A illustrates an exemplary environment in which a new WLAN (160 MHz) 200 needs to share the frequency spectrum with existing narrower WLANs 201, 202, and 203 (e.g. 40 MHz) and radio devices (e.g. radar) 205 and 206.

A possible solution to a crowded spectrum (as shown in FIG. 2A) is a non-contiguous bandwidth mode of operation in which the bandwidth of WLAN 200 is split up into two frequency segments, e.g. segment 210 (80 MHz) and segment 211 (80 MHz), thereby increasing the probability of finding available channels for transmission. In one embodiment, a non-contiguous 160 MHz transmission may use any two 80 MHz channels. In FIG. 2A, segment 210 is transmitted in an available, low frequency portion of a U-NII Worldwide band, whereas segment 211 is transmitted in the U-NII 3 band. Segments can be located in any available channels in the operating environment.

Figure 2B:
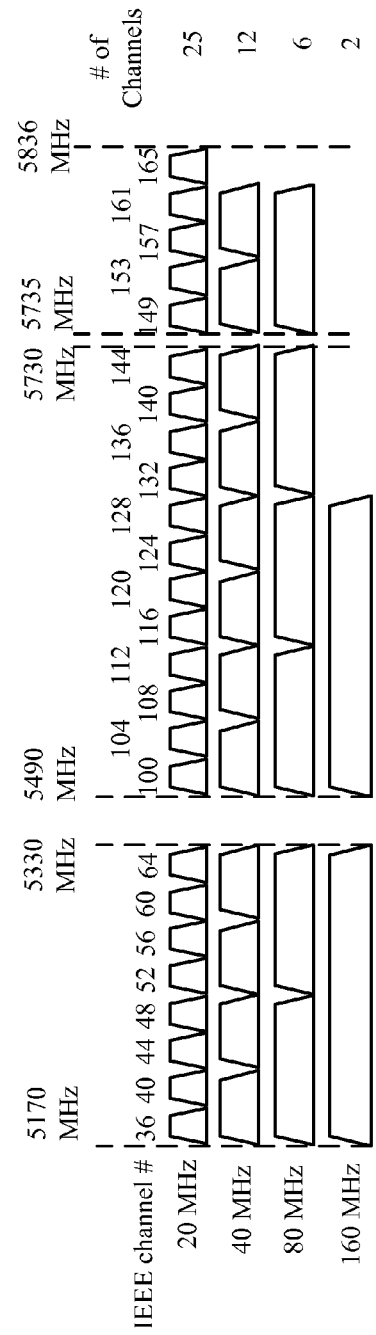
FIG. 2B illustrates available channels and associated bandwidths in the 5 GHz band according to various IEEE 802.11 standards.

FIG. 2B illustrates the available channels in the 5 GHz band in the United States. Note that the 20 MHz channels are designated in 802.11a (with the exception of channel 144), the 40 MHz channels are designated in 802.11n (with the exception of the 40 MHz channel having primaries at 140 and 144), and the 20+40+80+160 MHz channels are proposed to be designated in 802.11ac. Note that only the channel numbers for the 20 MHz channels are shown in FIG. 2B. The channel numbers for the other bandwidth channels (i.e. 40, 80, and 160 MHz) used herein are based on the 20 MHz channels closest in frequency. For example, the lowest frequency 40 MHz channel has a channel number of 38 referenced herein, which can be discerned by its location relative to the 20 MHz channels 36 and 40.

Referring back to FIG. 2A, note that segments 210 and 211 are used synchronously, i.e. both segments are in transmitter (TX) mode or both segments are in receiver (RX) mode. Moreover, in a non-contiguous transmission, the signals on segments 210 and 211 are coupled to the same receiver(s).

Note that in prior WLAN standards, the BSS (basic service set) bandwidth is essentially static, i.e. it was very rare or uncommon for the BSS bandwidth to change. In contrast, proposed WLAN standard IEEE 802.11ac allows the bandwidth to dynamically change packet to packet. In accordance with one aspect of improved transmissions in proposed 802.11ac and described in further detail below, the protocol data unit (PPDU) may be modified to support this capability. Moreover, the PPDU may also be modified to support different modulations (MCS) and transmit power levels on a per packet basis, and even on a per segment basis.

Figure 3:
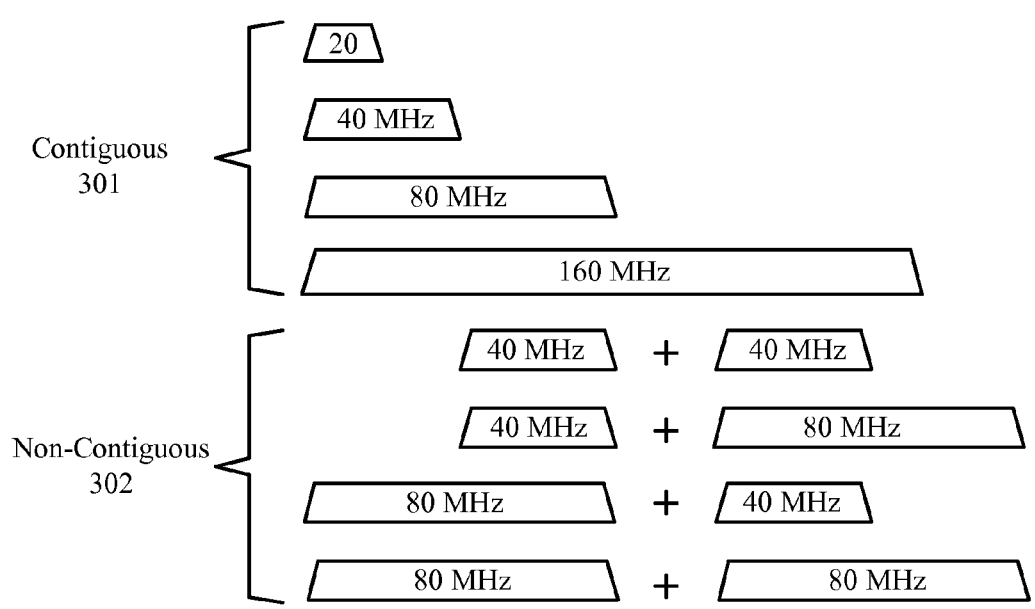
FIG. 3 illustrates various embodiments of contiguous and non-contiguous spectrums.

FIG. 3 illustrates exemplary contiguous spectrums 301 and non-contiguous spectrums 302 for a BSS (basic service set) to be setup in its network. When operating with contiguous spectrums 301, the selected BSS bandwidth may be 20 MHz, 40 MHz, 80 MHz, or 160 MHz. When operating in non-contiguous spectrums 302, the selected BSS bandwidth may be one of the following combinations of primary and secondary segments, wherein the first bandwidth is listed in the primary segment and the second bandwidth is listed in the secondary segment: 40 MHz+40 MHz, 40 MHz+80 MHz, 80 MHz+40 MHz, and 80 MHz+80 MHz. Note that non-contiguous transmission modes are not limited to the above bandwidth combinations, and may be a combination of any arbitrary bandwidth in general.

If tones between contiguous 40 MHz units (mid-tones) are filled with data, then there may be 7 different rates for a given MCS results. The 7 different rates (i.e. cases) are illustrated in Table 3.

TABLE 3

| Case | Total BW (MHz) | Segment 1 (MHz) | Segment 2 (MHz) |
| --- | --- | --- | --- |
| 1 | 40 | 40 | — |
| 2 | 80 | 80 | — |
| 3 | 80 | 40 | 40 |
| 4 | 120 | 120 | — |
| 5 | 120 | 80 | 40 |
| 6 | 160 | 160 | — |
| 7 | 160 | 80 | 80 |

Figure 4A:
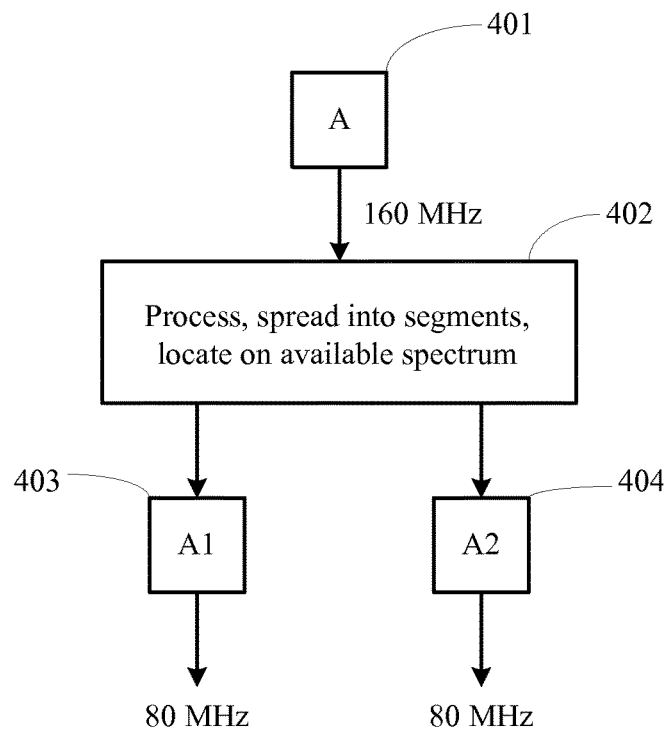
FIGS. 4A and 4B illustrate an exemplary transmission technique in proposed 802.11ac.
Figure 4B:
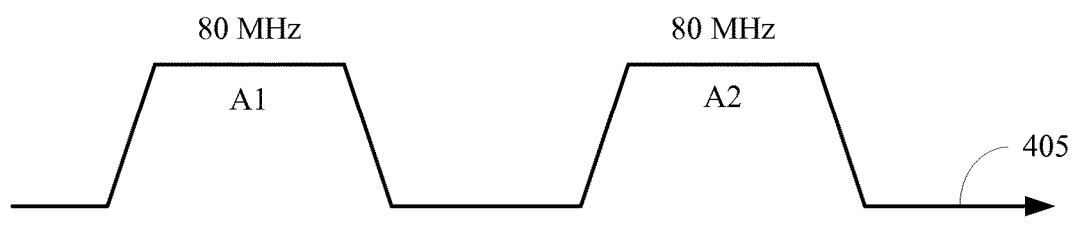

FIGS. 4A and 4B illustrate an exemplary transmission technique in proposed 802.11ac. To achieve high throughput performance, the WLAN system may determine the available channel bandwidths and the bandwidth required for the packet to be transmitted to appropriately select the contiguous or non-contiguous mode of operation. For example, FIG. 4A illustrates a WLAN system transmitting message A (401), wherein message A requires 160 MHz of bandwidth. The WLAN system may determine, based on the available spectrum, whether message A may be transmitted with a contiguous transmission (a preferred embodiment) or must be transmitted with a non-contiguous transmission. Message A can be processed, spread into the appropriate number of segments, and then located on the available spectrum (402). Assuming that non-contiguous transmission is appropriate, message A can be processed and spread into two segments of 80 MHz (A1:403 and A2:404) and then located on available spectrum for a non-contiguous transmission (405), as illustrated in FIG. 4B.

In proposed 802.11ac, the BWUs may be setup or structured in a variety of ways. For example, a VHT Information Element can indicate available BWUs in the BSS via the following information. The "primary channel" is the channel number for the primary 20 MHz channel. The "secondary channel offset" is the offset of the secondary 20 MHz channel relative to the primary channel, wherein the offset is one of (−1, 0, +1). The BWU 2 channel is the channel number of the 40 MHz BW unit 2. The BWU 3 channel is the channel number of the 40 MHz BW unit 3. The BWU 4 channel is the channel number of the 40 MHz BW unit 4. Note that the channel number "0" indicates an unused band.

In proposed 802.11ac, a VHT capability element can indicate station (STA) capability with the following information. The "maximum bandwidth" indicates the maximum bandwidth of packets the receiving device is capable of receiving (e.g. 40/80/160 MHz). The "support for non-contiguous bandwidth" may be "0" or "1". If 0, then the receiving device is not capable of receiving packets using non-contiguous frequency segments. If 1, then the receiving device is capable of receiving packets using non-contiguous frequency segments. If the maximum BW=80 MHz, then the receiving device may choose either 0 or 1 for "support non-contiguous". If the maximum BW>80 MHz, then the receiving device must set "support non-contiguous" to 1.

Figure 5A:
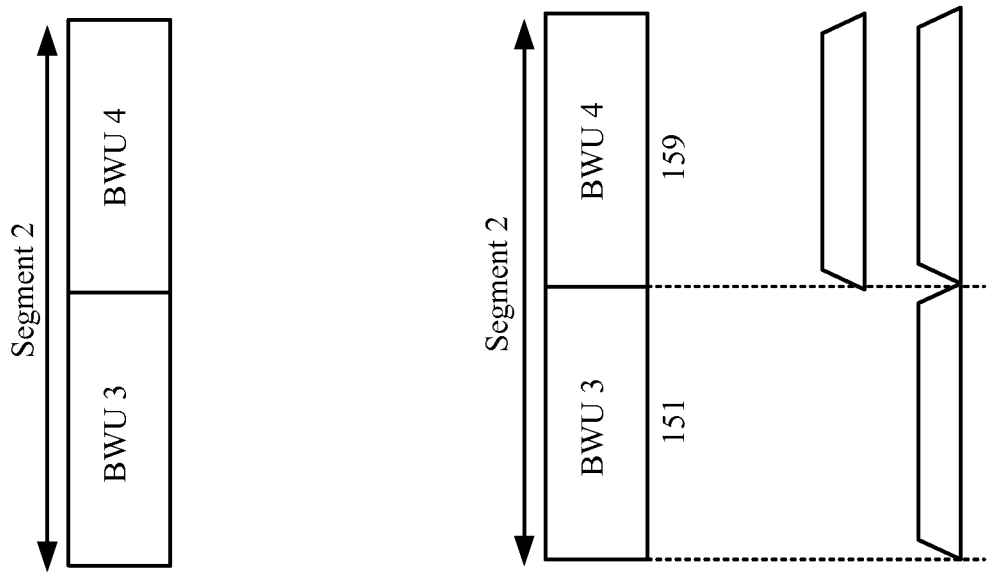
FIG. 5A illustrates an exemplary BWU structure having two segments.

FIG. 5A illustrates an exemplary BWU structure having two segments, segments 1 and 2 (which imply a non-contiguous transmission). Segment 1 includes BWU 1 and BWU 2. BWU 1 includes a primary channel (20 MHz) and a secondary channel (20 MHz). BWU 2 has 40 MHz of spectrum. Segment 2 includes BWU 3 and BWU 4, which each have 40 MHz of spectrum.

In accordance with one aspect of an improved wireless transmission, a bit map can be used to indicate whether each of BWU 1, BWU 2, BWU 3, or BWU 4 is being used. Specifically, each BWU may be assigned a bit number, i.e. bit 0 for BWU 1, bit 1 for BWU 2, bit 2 for BWU 3, and bit 3 for BWU 4. Each of bits 1-3 has a value of "0" if the BWU is not used and "1" if the BWU is used in the packet, as indicated in Table 4. Because BWU 1 includes both the primary and secondary channels, a "0" indicates that only the primary channel is being used and a "1" indicates that both the primary and second channels are being used. In one embodiment, this bit map is transmitted as 4 bits in the VHT-SIG-A field, which is provided in proposed 802.11ac. In one embodiment, for any packet bandwidth greater than 40 MHz, BWU 1 must use 40 MHz (Bit 0=1).

TABLE 4

| Value | Bit 0 (BWU 1) | Bit 1 (BWU 2) | Bit 2 (BWU 3) | Bit 3 (BWU 4) |
|---|---|---|---|---|
| 0 | 20 MHz (Primary Channel only) | Not used | Not used | Not used |
| 1 | 40 MHz (Primary & Secondary Channels) | Used | Used | Used |

Figure 5B:
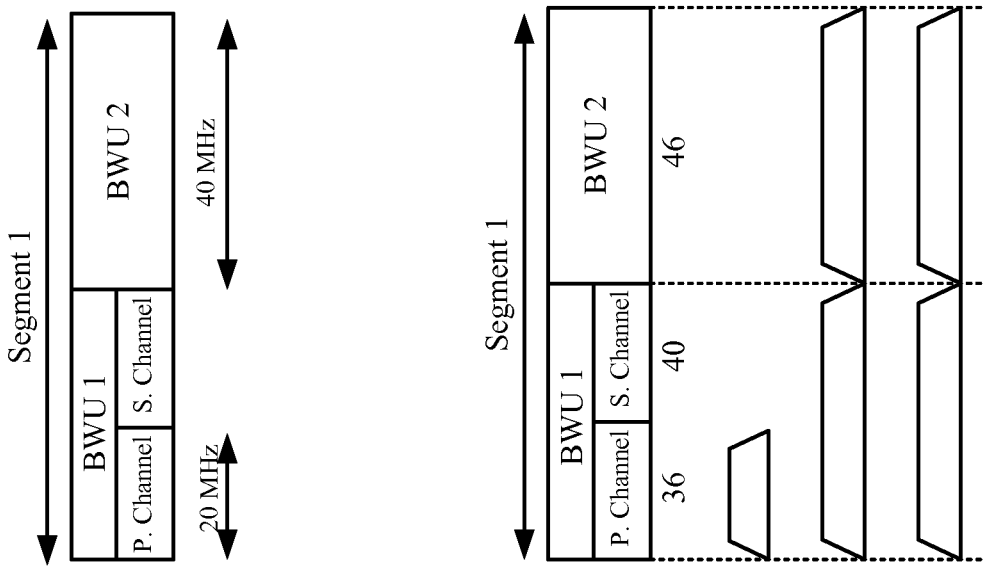
FIG. 5B illustrates three packet embodiments in which transmission of segment 1 (BWU 1 and BWU 2) precedes that of segment 2 (BWU 3 and BWU 4).

FIG. 5B illustrates three packet embodiments in which transmission of segment 1 (BWU 1 and BWU 2) precedes that of segment 2 (BWU 3 and BWU 4) (i.e. the same BWU structure as FIG. 5A). Packet 501 is a 20 MHz packet that only occupies the primary channel, which is located at channel 36. Thus, the bandwidth bits for packet 501 are "0000". Packet 502 is a 120 MHz packet in which 40 MHz is located in each of BWU 1 (channels 36, 40), BWU 2 (channel 46), and BWU 4 (channel 159). Thus, the bandwidth bits for packet 502 are "1101". Packet 503 is a 160 MHz packet in which 40 MHz is located in each of BWU 1 (channels 36, 40), BWU 2 (channel 46), BWU 3 (channel 151), and BWU 4 (channel 159). Thus, the bandwidth bits for this embodiment are "1111". Note that the secondary channel offset (in relation to the primary channel, and referring to FIG. 2B) is equal to 1.

Figure 5C:
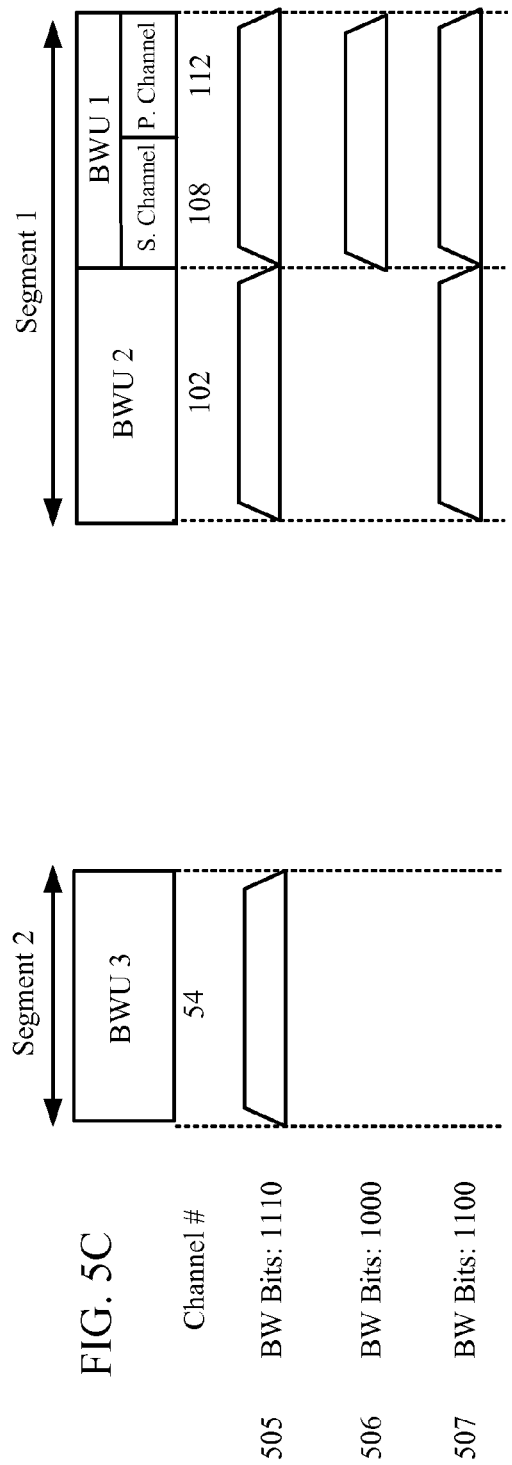
FIG. 5C illustrates three packet embodiments in which transmission of segment 2 (BWU 3) precedes that of segment 1 (BWU 1 and BWU 2).

Note that the bit order in the bit map remains the same irrespective of the actual spectrum locations for the BWUs. For example, FIG. 5C illustrates three packet embodiments in which transmission of segment 2 (BWU 3) precedes that of segment 1 (BWU 1 and BWU 2). Packet 505 is a 120 MHz packet in which 40 MHz is located in BWU 3 (channel 54), and 40 MHz is located in each of BWU 2 (channel 102) and BWU 1 (channels 108, 112). Thus, the bandwidth bits for packet 505 are "1110". Note that, in packet 505, BWU 1 is located at the highest frequency in the packet and BWU 3 is located at the lowest frequency in the packet. Therefore, BWU 1 can be characterized as defining the least significant bit (LSB) and BWU 3 can be characterized as defining the most significant bit (MSB). Note further that the secondary channel is a lower frequency than the primary channel. Therefore, the secondary channel offset is equal to −1. Packet 506 is a 40 MHz packet located in BWU 1 (channels 108, 112). Thus, the bandwidth bits for packet 506 are "1000". Packet 507 is an 80 MHz packet in which 40 MHz is located in BWU 1 (channels 108, 112) and 40 MHz is located in BWU 2 (102). Thus, the bandwidth bits for packet 507 are "1100".

Figure 5D:
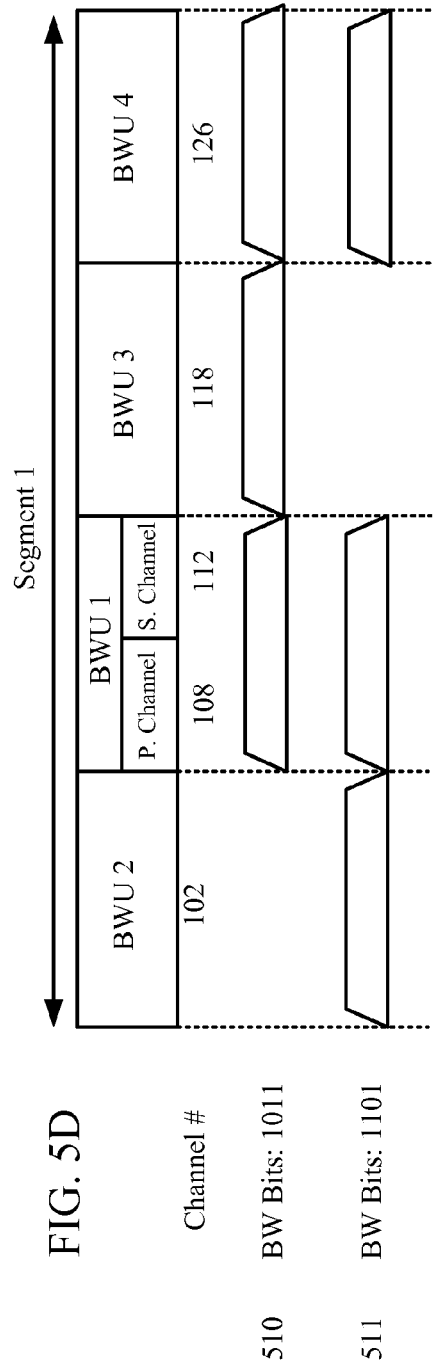
FIG. 5D illustrates two embodiments in which only one segment is transmitted.

Notably, the bit map is equally applicable to single segment transmissions. For example, FIG. 5D illustrates two embodiments in which only one segment is transmitted. In both embodiments, segment 1 includes the following bandwidth units listed from low to high frequency: BWU 2, BWU 1, BWU 3 and BWU 4. In these embodiments, the primary channel is lower than the secondary channel. Therefore, the secondary channel offset is equal to 1. Packet 510 is a 120 MHz packet in which 40 MHz is located in each of BWU 1 (channels 108, 112), BWU 3 (channel 118), and BWU 4 (channels 126). Thus, the bandwidth bits for this embodiment are "1011". Note that packet 510 transmits using a contiguous spectrum. Packet 511 is a 120 MHz packet in which 40 MHz is located in each of BWU 2 (channel 102), BWU 1 (channels 108, 112), and BWU 4 (channel 126). Thus, the bandwidth bits for packet 511 are "1101". Note that packet 511 transmits using a non-contiguous spectrum.

FIG. 6A illustrates an exemplary bit map table showing five bandwidth unit configurations for contiguous or non-contiguous transmissions. The coding of this bit map table can be detected by a receiver, thereby allowing the receiver to determine the bandwidth of the packet being received. Note that for any packet, the primary channel P20 is used. Specifically, BWU 1 includes the 20 MHz primary channel (P20), which is located in the first slot. If the transmission is 20 MHz, then only the primary channel P20 is used and the bit map coding is "0000". This coding reflects that the bit value in the second slot is 0, i.e. no transmission in the second slot. On the other hand, if the transmission is 40 MHz, then the bit map coding is "1000". This bit coding reflects that the bit value of the second slot of BMW 1 is 1.

If the transmission is 80 MHz, then the bit map coding is 1100 or 1010 depending on the BWUs utilized (case 3 or case 4). If the transmission is 160 MHz, then the bit map coding is 1111. BWUs can be listed in the column order (e.g. BWU 2, BWU 1, BWU 3 and BWU 4) to indicate their order in the frequency spectrum. As noted above, the bits of the bit map reflect whether data is present in the ordered BWUs, i.e. BWU 1, BWU 2, BWU 3, BWU4 (and therefore do not provide information regarding the actual transmission order of the BWUs). Note that FIG. 6 shows exemplary, not exhaustive, combinations for a transmitted PPDU.

Note that the bandwidth of the BSS corresponds to the maximum bandwidth of any PPDU transmission allowed in the BSS. Thus, the bandwidth of each PPDU transmission may be less than or equal to the BSS bandwidth. In case of PPDU transmissions in a non-contiguous BSS, the BWUs may be positioned in different portions of a first segment or a second segment (see, FIG. 5C).

Figure 6B:
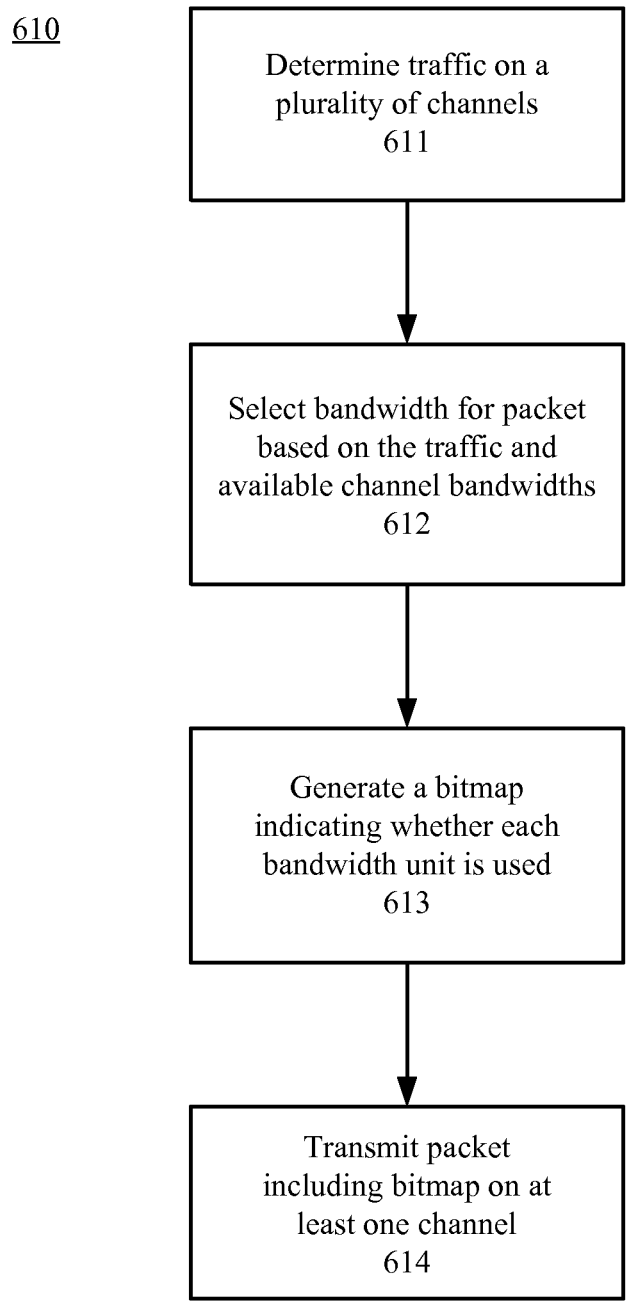
FIG. 6B illustrates a method for transmitting bitmap information in a wireless system.

FIG. 6B illustrates a method 610 for transmitting bitmap information in a wireless system. Step 611 determines the traffic on a plurality of channels. Step 612 selects the bandwidth for a packet based on the traffic and available channel bandwidths. Step 613 generates a bitmap indicating whether each bandwidth unit is used. Step 614 transmits the packet with the bitmap on at least one channel.

In prior WLAN systems, the receiver generally does not need know the bandwidth of the packet that it is receiving because the bandwidth of the packet is generally static. In proposed 802.11ac, the receiver should know the bandwidths of the BWUs to efficiently process the received packet. In one embodiment, a receiver may look at the energy per each bandwidth portion (e.g. each 20 MHz sub-bands) and may determine the bandwidth of the signal based on how many of the bandwidth portions have meaningful energy. For example, if there is a 160 MHz packet, the energy detection system may detect a rise in energy in the entire 160 MHz band or all of the eight 20 MHz sub-bands. Alternatively, if there is a 20 MHz packet, the energy detection system may only detect a rise in energy in the 20 MHz sub-band. In one embodiment, an automatic gain control (AGC) unit may be used to detect energy to determined bandwidth.

In another embodiment, the receiver can use time domain decoding or preamble signature detection to decode the bandwidth information from the signal portion of the message. In IEEE 802.11 terminology, this technique is a type of STF pattern detection in the VHT preamble.

Figure 7A:
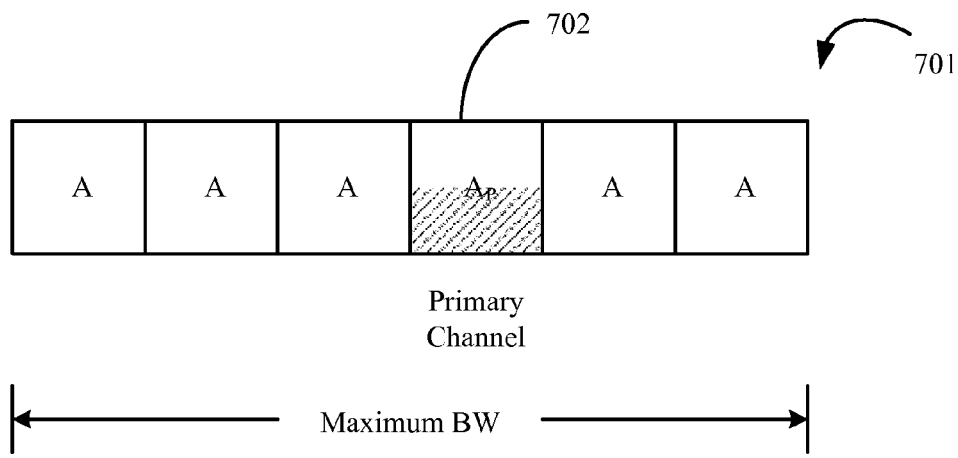
FIG. 7A illustrates a frequency segment associated with multiple channels.
Figure 7B:
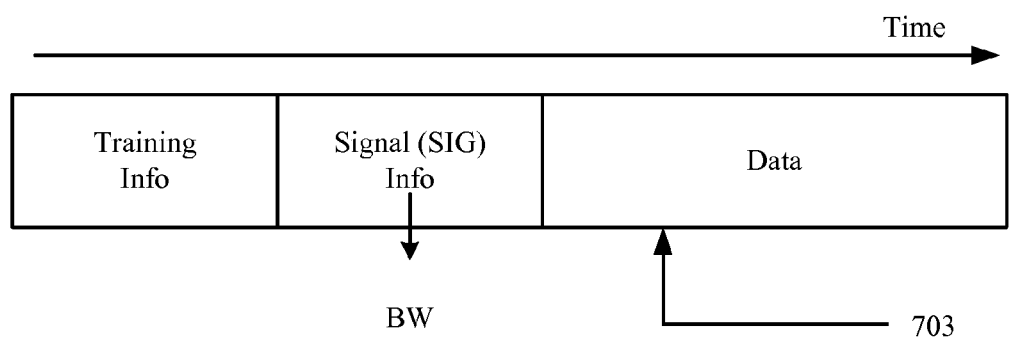
FIG. 7B illustrates a simplified packet including training and signal information and a data portion.

FIG. 7A illustrates a frequency segment 701 associated with multiple channels, each channel represented by A. Frequency segment 701 has a maximum bandwidth equal to the sum of the bandwidths that are required for all A channels, which includes a primary channel $A_p$ 702. In one embodiment, each of channels A and $A_p$ have the same bandwidth (e.g. 20 MHz). Transmitted information associated with any channel, i.e. the A or the $A_p$ channel, in the time domain has a training portion (including information in both the legacy and VHT training fields), a signal portion, and a data portion, as shown in FIG. 7B. In proposed 802.11ac, the primary channel $A_p$ includes within the signal (SIG) portion, information regarding the maximum bandwidth of frequency segment 701. This signal portion may also be referred to as the VHT Information Element. Hence, by decoding the signal portion of the information associated with the primary channel $A_p$, the maximum bandwidth of the message may be determined. As described herein, in accordance with an improved transmission, the VHT Information Element may also provide information regarding the used BWUs in the BSS.

Notably, the above-described packet structure with segments and multiple BWUs may be extended to other wireless systems. This structure may offer solutions where there may be a large spectrum required for the packet transmission, but only small slices (or pieces) of spectrum available. These environments suggest a non-contiguous solution may be required. Wireless examples of this environment may include, but are not limited to: (1) proposed standard IEEE 802.11ah for a sensor network, e.g. smart metering, (2) proposed standard IEEE 802.11af for cognitive radio operating in the TV White Spaces (~900 MHz), i.e. the spectrum already allocated to the TV broadcasters and at the same time not used, and (3) WiFi applications in the 900 MHz band.

In these applications (and others), the protocol structure may have the following considerations. First, a BWU may be any value that is compatible with the wireless standard. For example, in proposed 802.11ac, the BWU is 40 MHz, whereas for 802.11ah, the BWU may be 5 MHz. In other applications the BWU may be greater than or less than 40 MHz. Second, there may be any number of BWUs and/or any number of segments per packet. Third, the packet may be transmitted in more than two contiguous spectrums. Fourth, the BWUs may not be in contiguous spectrum. Fifth, specifying the center frequency of the BWU determines the segmentation.

Figure 8A:
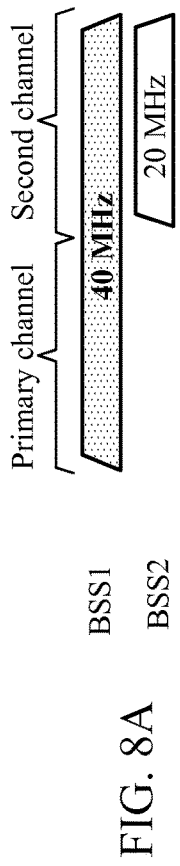
FIG. 8A shows a 40 MHz BSS (BSS1) overlapping with a 20 MHz BSS (BSS2) in a secondary channel, which could occur in 802.11n.
Figure 8B:
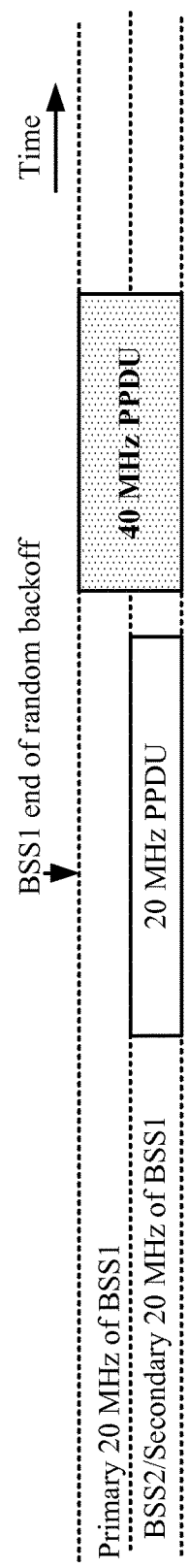
FIG. 8B illustrates a first solution in which BSS1 waits for its transmission until the entire 40 MHz is available, i.e. after the transmission of BSS2.
Figure 8C:
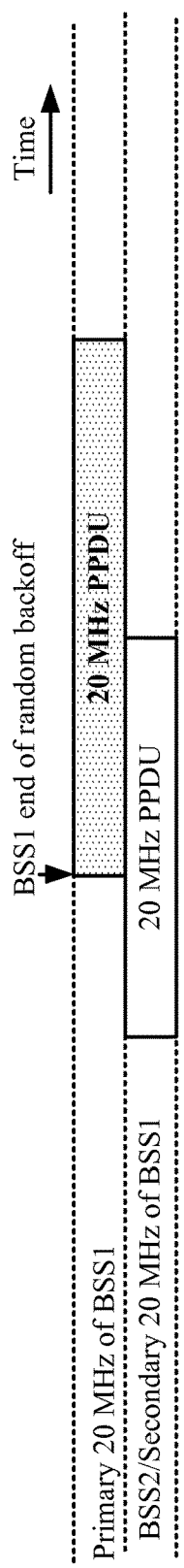
FIG. 8C illustrates a second solution in which BSS1 can transmit its PPDU using 20 MHz only (after the end of random backoff) on the primary channel while BSS2 uses the secondary channel for its 20 MHz transmission (which was initiated before the transmission by BSS1).

There are various techniques to transmit a physical layer convergence procedure (PLCP) protocol data unit (PPDU) when BSSs overlap. For example, FIG. 8A shows a 40 MHz BSS (BSS1) overlapping with a 20 MHz BSS (BSS2) in a secondary channel, which could occur in 802.11n. FIG. 8B illustrates a first solution in which BSS1 waits for its transmission until the entire 40 MHz is available, i.e. after the transmission of BSS2. FIG. 8C illustrates a second solution in which BSS1 can transmit its PPDU using 20 MHz only (after the end of random backoff) on the primary channel while BSS2 uses the secondary channel for its 20 MHz transmission (which was initiated before the transmission by BSS1). Note that once 20 MHz transmission is commenced for BSS1, the transmission must remain at 20 MHz irrespective of the availability of 40 MHz after BSS2 completes its transmission.

Figure 8D:
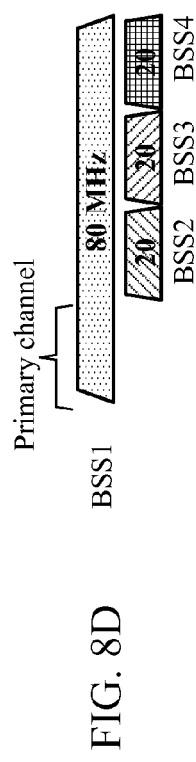
FIG. 8D illustrates a BSS1 having an 80 MHz transmission overlapping with multiple 20 MHz BSSs, i.e. BSS2, BSS3, and BSS4.
Figure 8E:
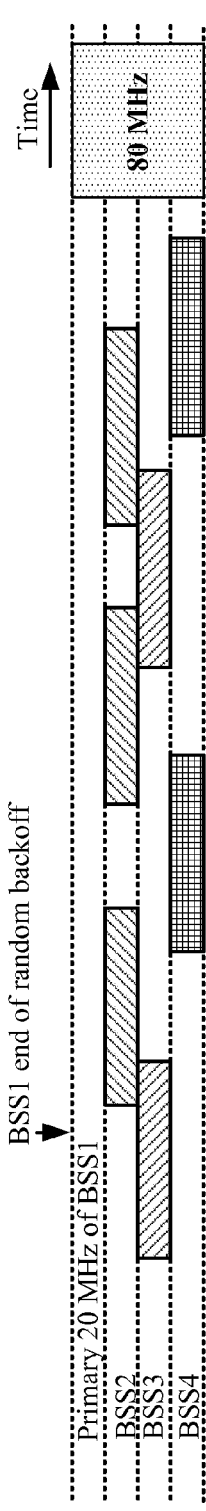
FIG. 8E illustrates that, when using a static bandwidth transmission, BSS1 may need to wait a significant time for the entire 80 MHz to be free.

Notably, in proposed 802.11ac for a WLAN supporting 80 or 160 MHz, resolving transmission overlap is significantly more challenging. For example, FIG. 8D illustrates a BSS1 having an 80 MHz transmission overlapping with multiple 20 MHz BSSs, i.e. BSS2, BSS3, and BSS4. As shown in FIG. 8E, using a static bandwidth transmission, BSS1 may need to wait a significant time for the entire 80 MHz to be free. As a result, significant degradation of throughput may result using static bandwidth transmission.

Figure 8F:
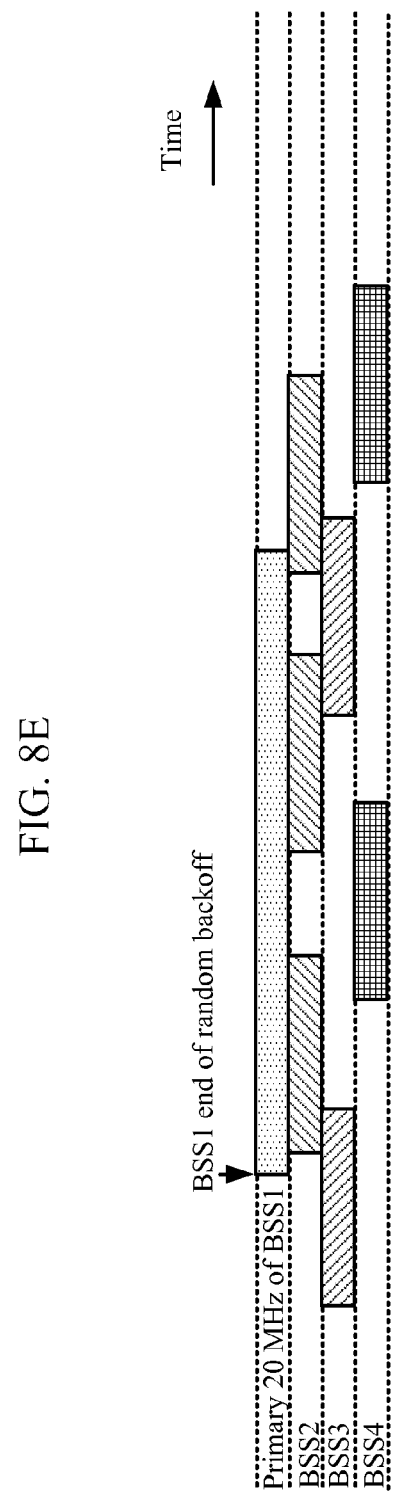
FIG. 8F illustrates a transmitter being configured to sense which portion of the BSS bandwidth is available, and to dynamically adjust the bandwidth to take advantage of an available channel.

In general, as the BSS bandwidth increases, there is an increased probability that the BSS is sharing the wide spectrum with one or more BSSs that overlap in frequency. The overlapping BSSs may have narrower bandwidths than the BSS of interest, BSS X. If a transmission in BSS X is made without first checking if any of the overlapping BSSs has an on-going transmission, then collision may occur and degrade the link throughput. Hence, sensing the channel first to see if the channel is free to be used is recommended. In proposed 802.11ac, and referring to FIG. 8F, the transmitter has the ability to sense which portion of the BSS bandwidth is available, and to dynamically adjust the bandwidth to take advantage of an available channel. For example, in FIG. 8F, the 80 MHz BSS1 can be dynamically adjusted to 20 MHz, which can start transmission after the end of random backoff in BSS1, thereby allowing concurrent transmission with BSS2, BSS3, and BSS4.

In accordance with one aspect of an improved, proposed 802.11ac WLAN, different modulations can be used in packets and may be applied on either contiguous or non-contiguous transmissions. For example FIG. 9A illustrates a waveform 901, which is a contiguous transmission including a first portion of the frequency spectrum transmitted with QPSK modulation and a second portion of the frequency spectrum transmitted with 64 QAM modulation. FIG. 9B illustrates a waveform 902, which is a non-contiguous transmission with QPSK modulation and 64 QAM modulation. Note that one portion of the transmission may also have a different power level than the other portion of the transmission. For example, in both FIGS. 9A and 9B, the 64

QAM portion of the frequency spectrum has a higher power level than the QPSK power level. Also, the two portions of the frequency spectrum may be different bandwidths, such as 20, 40, or 80 MHz.

Figure 9C:
FIG. 9C illustrates an exemplary technique for providing different modulations and coding rates in a packet for improved transmission.
Figure 9C:
Figure 9C:

FIG. 9C illustrates an exemplary technique 920 for providing different modulations and coding rates for improved transmission. Step 921 determines the traffic on a plurality of channels. Step 922 selects the bandwidth for a packet based on the traffic and available channel bandwidths. Step 923 selects the modulation and coding rate from a plurality of modulations and associated coding rates. Step 924 transmits the packet with the modulation and coding rate information on at least one channel.

In summary, the MCS, transmitted power, and/or bandwidth may be different between different segments.

Figure 10A:
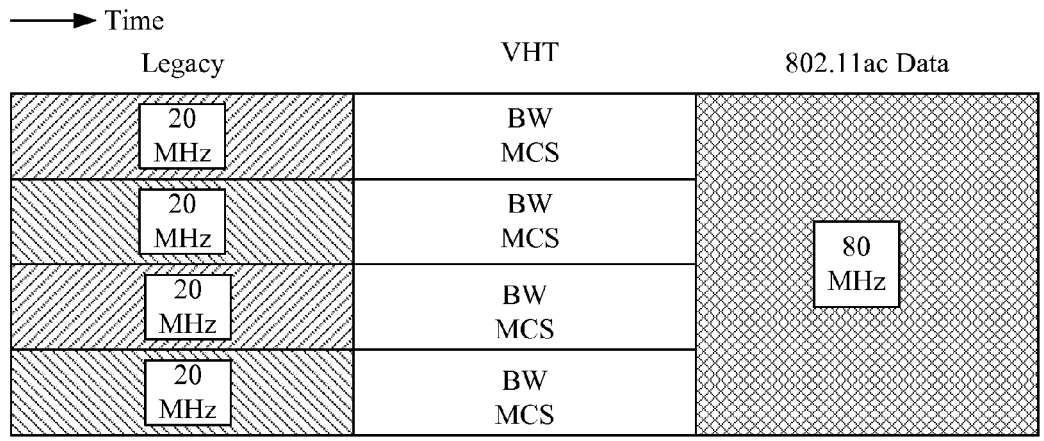
FIGS. 10A, 10B, and 10C illustrate exemplary modulation schemes for an improved transmission.
Figure 10B:
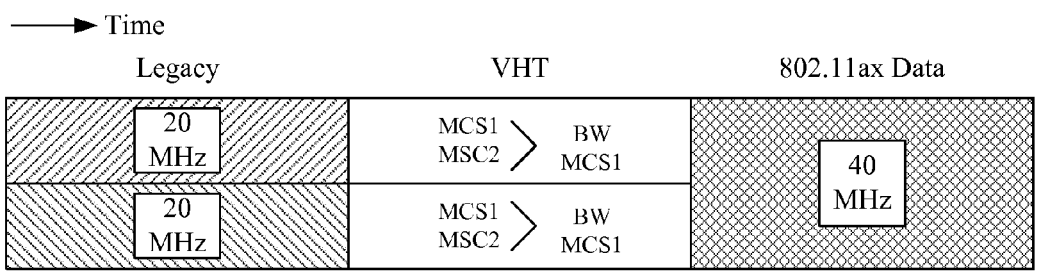
Figure 10C:
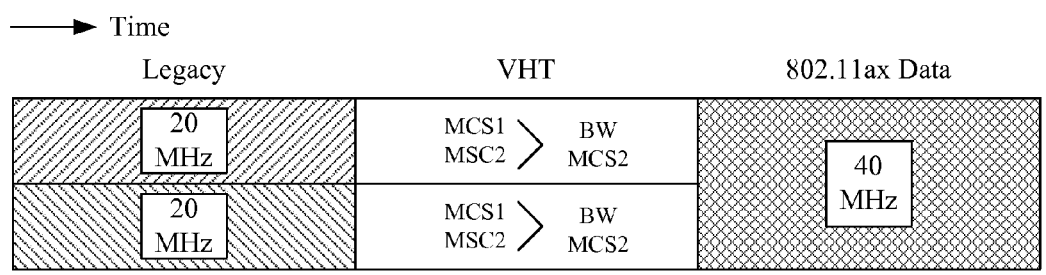

FIGS. 10A, 10B, and 10C illustrate exemplary modulation schemes for an improved transmission. Note that the proposed 802.11ac packet format includes a legacy portion, a VHT portion, and data. The legacy portion has training fields L-STF and L-LTF, as well as a signal field (L-SIG). The VHT portion has training fields VHT-STF and VHT-LTFs, which are sandwiched between signal fields VHT-SIG-A and VHT-SIG.B. FIG. 10A illustrates a contiguous spectrum for an 802.11ac packet including 20 MHz×4 legacy and VHT symbols followed by 80 MHz×1 data. Note that the VHT-SIG-A (which forms part of the VHT set of symbols in FIGS. 10A-10C) includes the bandwidth and the MCS (modulation) information.

FIGS. 10B and 10C illustrate two segments, segment 1 and segment 2 respectively, of a non-contiguous packet. Each segment may have a bandwidth of 40 MHz. In one embodiment, a transmitter in a WLAN system, generically named "11ax", can select and designate the modulation for each segment. For example, in segment 1 (FIG. 10B), modulation MCS1 is selected from the available modulations of MCS1 and MCS2. In contrast, modulation MCS2 is selected for segment 2 (FIG. 10C) from the available modulations of MCS1 and MCS2. In other embodiments, more than two modulations can be provided in the set of available modulations. Exemplary modulations include BPSK 1/2, QPSK 1/2, QPSK 3/4, 16-QAM 1/2, 16-QAM 3/4, 64-QAM 2/3, 64-QAM 3/4, 64-QAM 5/6, and 256-QAM. Note that the set of available modulations may vary from segment to segment in other embodiments. In one embodiment, irrespective of contiguous or non-contiguous transmission, the legacy and VHT symbols are repeated for each minimal bandwidth increment. In FIGS. 10A-10C, the minimal bandwidth increment is 20 MHz. Other embodiments may provide larger minimal bandwidth increments.

Additional methods and circuits to provide improved performance for dynamic PPDU bandwidth transmission are disclosed below.

Figure 11:
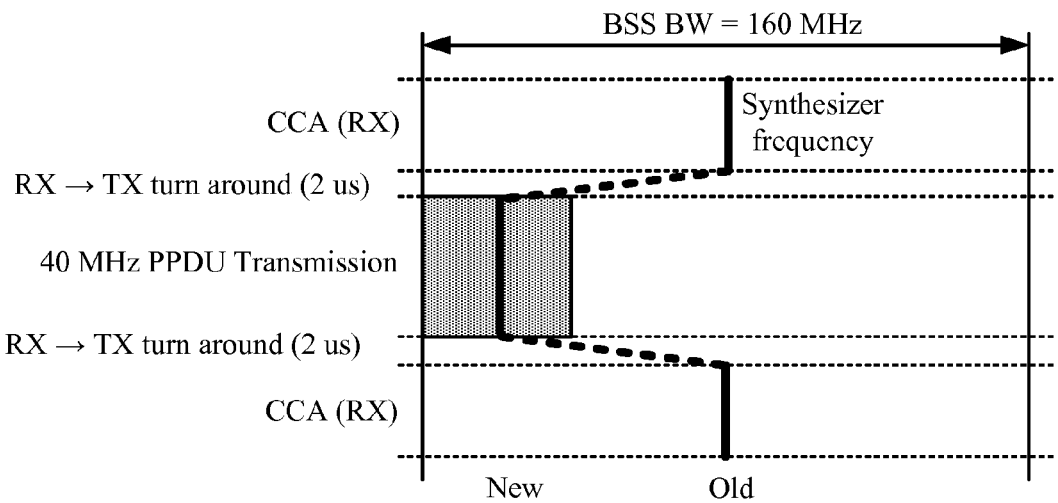
FIG. 11 illustrates how a synthesizer with a very short settling time can be used to meet various performance requirements.
Figure 12:
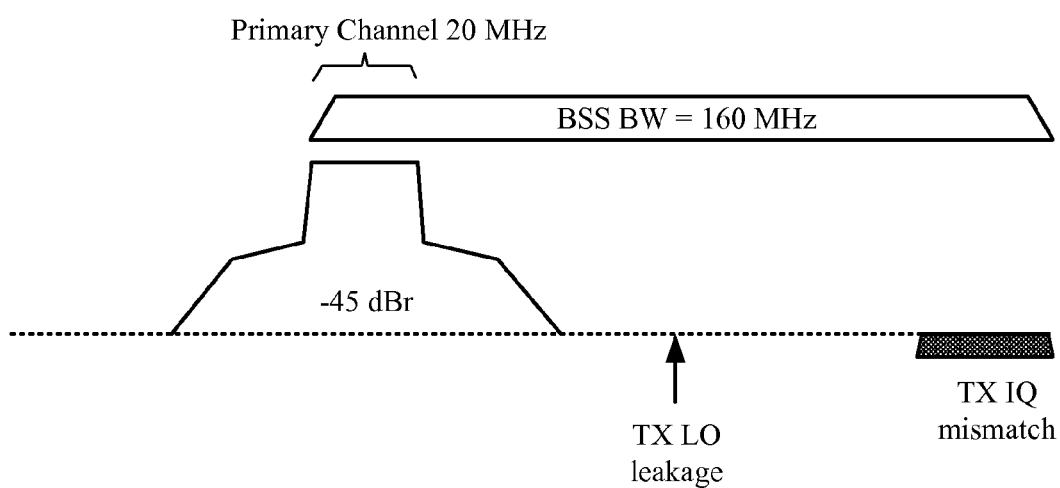
FIG. 12 illustrates an improved calibration method to compensate for analog impairments.

FIG. 11 illustrates how a synthesizer with a very short settling time (e.g. <2 microsecond) can be used to meet various performance requirements (described in reference to FIG. 12 and also shown in Table 4). In one embodiment, the carrier frequency for PPDU transmission is changed from the synthesizer frequency to avoid transmitting impairments outside the intended bandwidth of transmission.

FIG. 12 illustrates an improved calibration method to compensate for analog impairments. In this method, in-phase and out-of-phase signals are compared as shown by "TX IQ mismatch". In one preferred embodiment, this error can be pre-measured and pre-compensated in the digital domain. Note that the synthesizer frequency is fixed at the center of the BSS bandwidth, i.e. "TX LO leakage" (which always has some leakage). However, because of the synthesizer frequency offset, the actual transmission and its IQ mismatch will be symmetrically located on either side of the TX LO leakage (i.e. the synthesizer frequency). As shown in FIG. 12, in the worst case, the transmitting 20 MHz PPDU is located near the edge of BSS bandwidth.

TABLE 4

|  | 802.11ac requirement | After calibration |
|---|---|---|
| TX LO leakage | −45 dBr | −5 dBr |
| TX IQ mismatch | −45 dBr | −35 to −40 dBr |

Figure 13A:
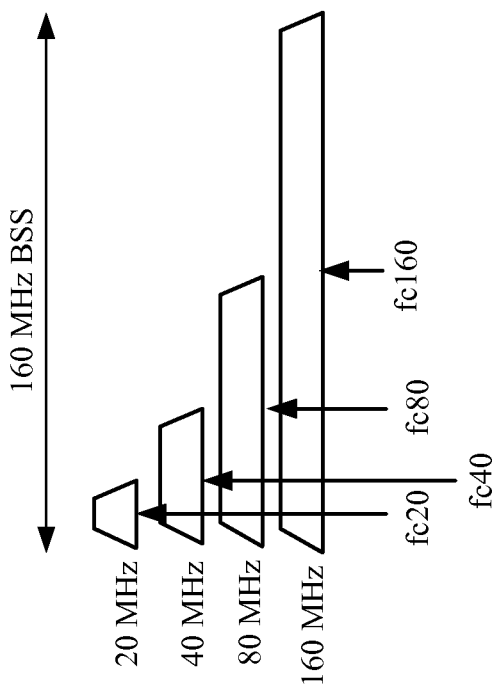
FIG. 13A illustrates a WLAN system with a 160 MHz BSS that may transmit a packet having a bandwidth of 20, 40, 80 or 160 MHz.
Figure 13B:
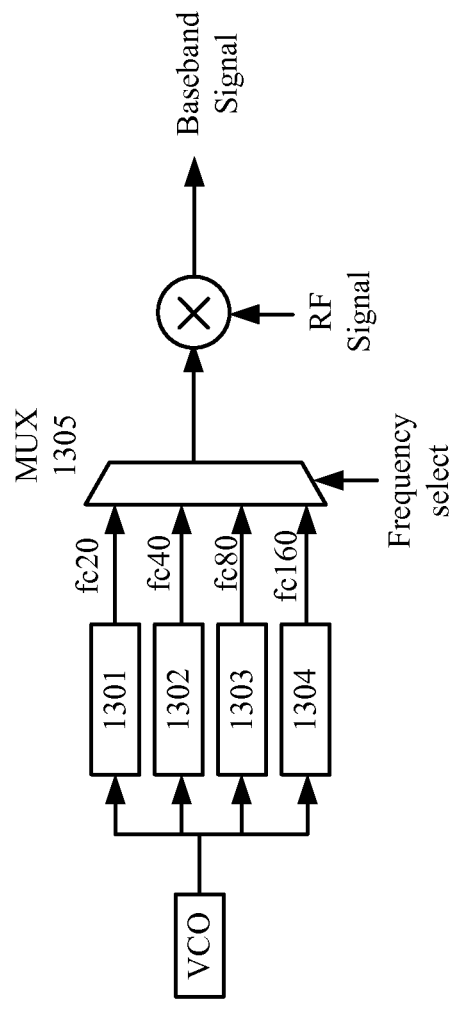
FIG. 13B illustrates an exemplary WLAN configuration including multiple synthesizers and a synthesizer selection component.

When in a 160 MHz BSS, a WLAN system may transmit a message having a bandwidth of 20, 40, 80 or 160 MHz, as shown in FIG. 13A. For these bandwidths, the optimal carrier may be fc20, fc40, fc80, or fc160, respectively (wherein "fc" indicates the center frequency of the related bandwidth). In one embodiment, to provide that optimal carrier, a wireless system can include four synthesizers, e.g. synthesizers 1301, 1302, 1303, and 1304, as illustrated in FIG. 13B. Synthesizers 1301-1304 each receive an output of the VCO and provide their synthesized outputs to a multiplexer 1305. Using a frequency select control signal to multiplexer 1305, the wireless system can select the synthesized signal that provides the optimal carrier depending on the bandwidth of the packet. Moreover, because synthesizers 1301-1304 operate in parallel, the issues of settling time are minimized. The selected signal is then mixed with an RF signal, thereby generating an output baseband signal.

Figure 14A:
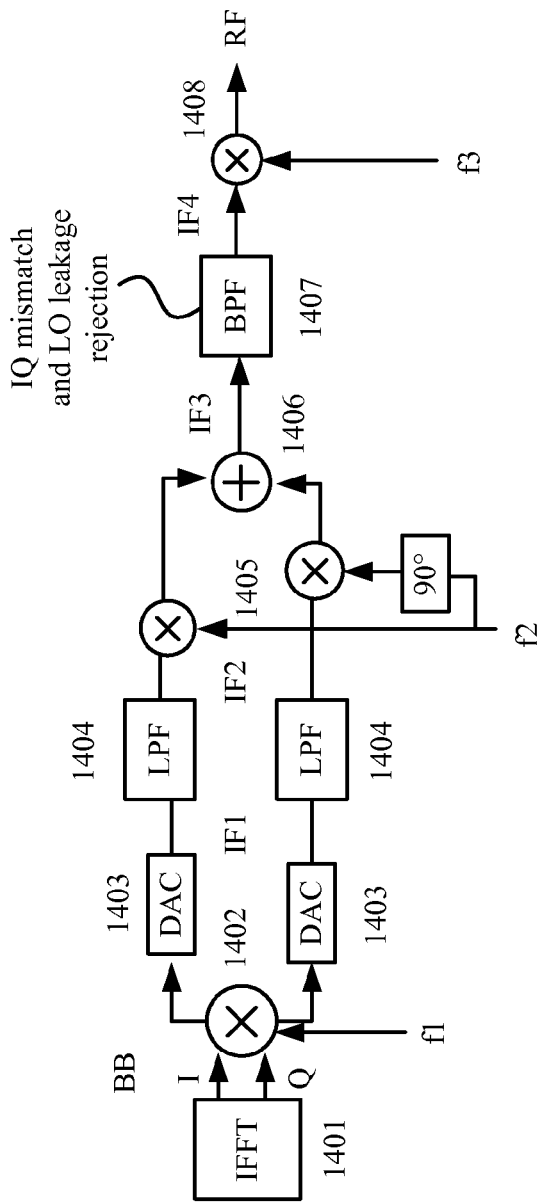
FIG. 14A illustrates an exemplary transmitter that facilitates improved intermediate frequency (IF) generation.
Figure 14B:
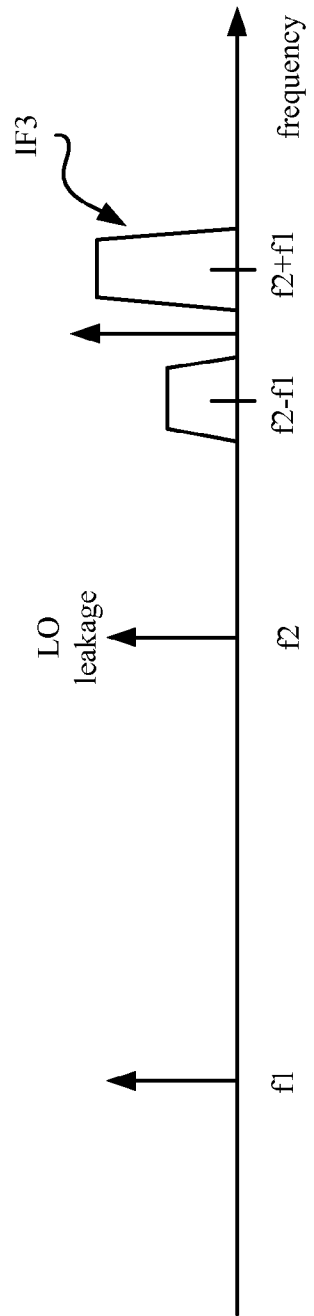
FIG. 14B illustrates that a digital IF, i.e. with a proper frequency input selection in the digital portion of a transmitter, may minimize actual amount of interference being emitted outside the intended transmit spectrum.

FIG. 14A illustrates an exemplary transmitter that facilitates improved intermediate frequency (IF) generation. Specifically, in the configuration shown, I and Q baseband outputs of an IFFT 1401 are digitally mixed in mixer 1402 with a first frequency f1 before being provided to digital-to-analog converters (DACs) 1403. DACs 1403 generate signals in first IF1. Low pass filters 1404 receive the signal in IF1 and generate signals in second IF2. Mixers 1405 receive the outputs in IF2 and generate inputs for adder 1406, which in turn generate a signal in IF3. A bandpass filter 1407 receives the output in IF3 and generates a signal in IF4. A mixer 1408 mixes the signal in IF4 with a third frequency f3 and generates an RF frequency. FIG. 14B illustrates that a digital IF, i.e. with a proper frequency f1 selection, may minimize actual amount of interference being emitted outside the intended transmit spectrum. Specifically, the lower frequency f1 is, the sharper bandpass filter 1407 must be to optimally filter the signal at IF3. Therefore, in one embodiment, frequency f1 is made as high as possible. In one embodiment in proposed 802.11ac, f1 is 352 MHz, f2 is 1.8 GHz, and f3 is 2.748-3.698 GHz.

In case of operating within a non-contiguous BSS (such as 80+80 MHz BSS), the bandwidth of a packet to be transmitted in each frequency segment may vary from packet to packet. In this case, each frequency segment may need to support dynamic bandwidth through any combination of the options described above. For example, the transmitter may employ two synthesizers, one for each frequency segment, each of which may have very short (e.g. <2 us) settling time. In another embodiment, one frequency segment may employ a frequency synthesizer that has a very short settling time, while the other frequency segment may select one of multiple concurrently running synthesizers (see, e.g. FIG. 13B).

Non-contiguous transmissions have two frequency segments that have an arbitrary frequency separation. In one embodiment, the signals for those frequency segments can be up-converted to their respective RF frequency using separate mixers. However, in another simpler embodiment, two synthesizers can be provided, one for each frequency segment. In yet another embodiment, shown in FIG. 15, a single synthesizer 1501 and a few mixers effectively implement two synthesizers. In one configuration, the circuit comprises synthesizer 1501 and three mixers 1502, 1503, and 1504. Synthesizer 1501 generates a signal at frequency fs, which is provided to mixer 1502. Mixer 1502 mixes the signal at fs with another signal at first frequency f1, and generates two signals at frequencies fc1 and fc2. Mixer 1503 mixes the signal at fc1 with the signal for frequency segment 1 to generate the RF signal of frequency segment 1. Similarly, mixer 1504 mixes the signal at fc2 with the signal for frequency segment 2 to generate the RF signal of frequency segment 2.

Figure 15:
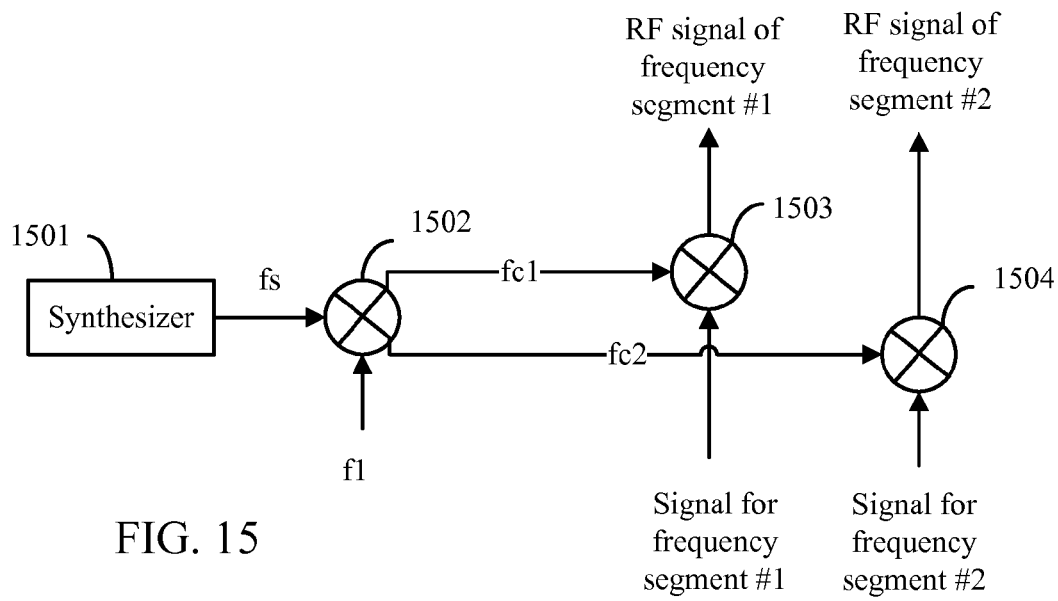
FIG. 15 illustrates an embodiment in which a single synthesizer and a few mixers can effectively implement two synthesizers.

In FIG. 15, frequencies fc1 and fc2 indicate the center frequencies of the related bandwidths for frequency segments 1 and 2, respectively. In one preferred embodiment, fs=(fc1+fc2)/2 and f1=(fc1−fc2)/2, wherein fc1 is higher than fc2. In this case, fc1=fs+f1 and fc2=fs−f1. Thus, by a proper selection of frequency fs, the two carrier signals at fc1 and fc2 can optimize the performance of the WLAN system. Moreover, in this configuration, synthesizer 1501 and mixers 1502, 1503, and 1504 can effectively operate as two synthesizers.

Figure 16A:
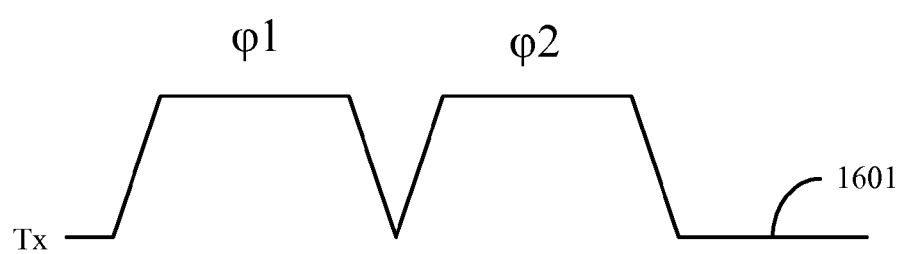
FIGS. 16A and 16B illustrate an exemplary WLAN system in which the transmitter is a non-contiguous device and the receiver is a contiguous device.

In one embodiment of a WLAN system, the transmitter is a non-contiguous device (e.g. 80 MHz+80 MHz), but the receiver is a contiguous device (e.g. 160 MHz). To minimize this difference, the transmitter can transmit a waveform 1601 with two non-contiguous frequency segments positioned next to each other, as shown in FIG. 16A. However, as noted above, each frequency segment may have a separate carrier (and hence a separate synthesizer). As a result, each carrier may have a separate phase shown as φ1 and φ2. Thus, although the transmit spectrum may look like a contiguous 160 MHz, the phase of the two carriers of the transmitter may not be correlated because of different phase noise for each synthesizer.

Figure 16B:
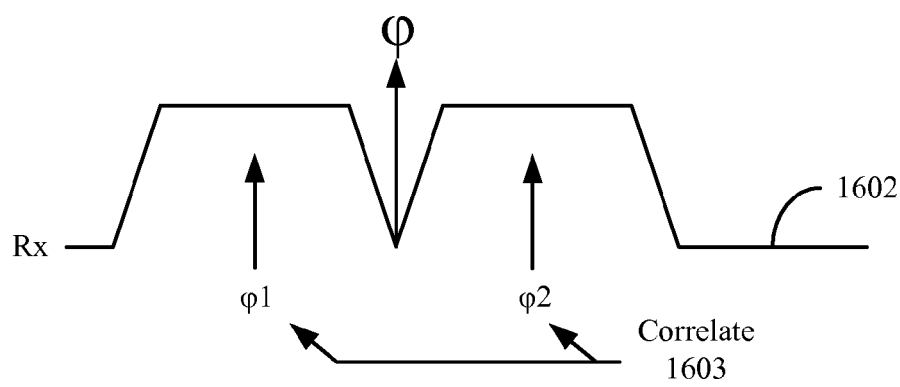

As a contiguous device, the receiver typically has only one carrier and thus only one phase, shown as φ on a waveform 1602 in FIG. 16B. Also as shown on waveform 1602, the received frequency segments have a phase φ1 and φ2, respectively. Designing a receiver to effectively operate may be a challenge because, as noted above, the phase (and the phase noise) of the two carriers of the transmitter may not be correlated. Thus, the receiver (a contiguous device) may not properly receive the signal from the transmitter (a non-contiguous device).

In one embodiment utilizing a digital solution, the receiver can perform phase tracking per each 80 MHz. In another embodiment, all synthesizers of the transmitter can be designed to have correlated phase and phase noise, as indicated by step 1603.

Figure 17:
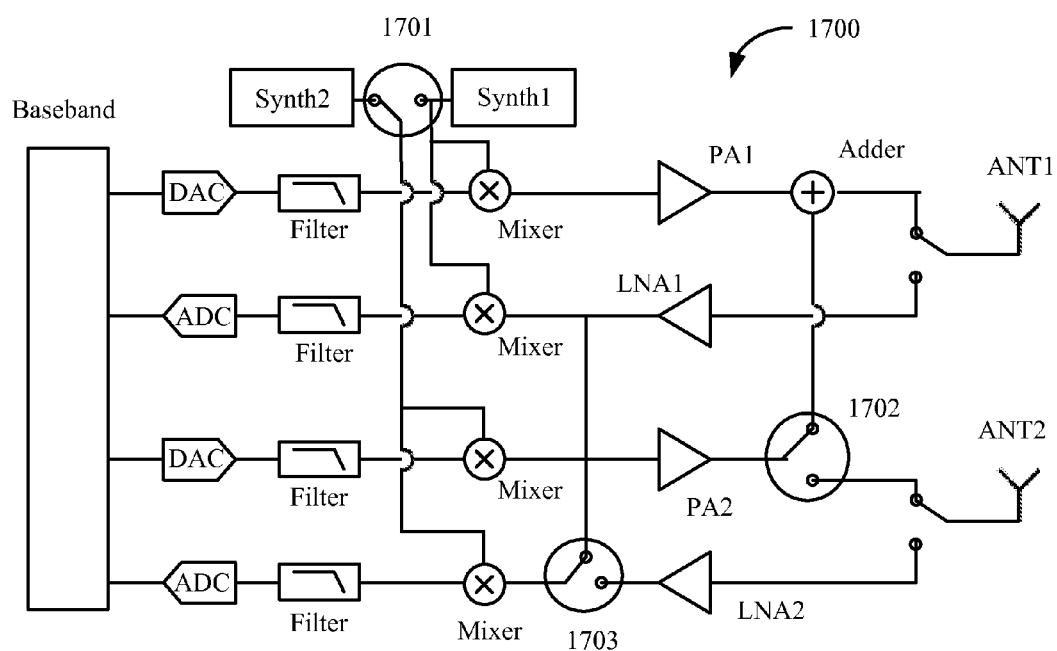
FIG. 17 illustrates an exemplary configurable transceiver that can provide both non-contiguous and MIMO operation.

Note that additional analog circuitry may be required for a WLAN device to support two spectrums when transmitting or receiving a packet. In one embodiment, to reduce the cost of this device, it can be designed to support more than one application. For example, the requirements for non-contiguous and multiple-input multiple-output (MIMO) operation may be very similar. FIG. 17 illustrates a transceiver 1700 that can support both non-contiguous and MIMO operation using switches 1701, 1702, and 1703.

Switch 1701 determines whether the mixers receive signals from only a first synthesizer Synth1 or whether half of the mixers receive signals from first synthesizer Synth1 and the other half of the mixers receive signals from a second synthesizer Synth1. Switch 1702 determines whether the outputs of power amplifiers PA1 and PA2 are summed and provided to only a first antenna (ANT1) or provided respectively to first antenna ANT1 and a second antenna ANT2. Switch 1703 determines whether outputs of low noise amplifiers LNA1 and LNA2 are provided to only one mixer or to two mixers for subsequent receive processing.

Using switches 1701, 1702, and 1703, transceiver 1700 can selectively support 3×3 non-contiguous 160 MHz, 6×6 contiguous 80 MHz transmission, 2×2 80 MHz MIMO operation, and 1×1 non-contiguous 80+80 MHz transmission. Using similar switching configurations, WLAN systems may also implement WLAN spatial modes, or implement WLAN modes that may require wider bandwidth.

While various embodiments have been described, it may be apparent to those of ordinary skill in the art that other embodiments and implementations may be possible that are within the scope of the embodiments. For example, any combination of any of the systems or methods described in this disclosure may be possible. In addition, the systems and methods described above may be directed to WLAN systems or to other wireless systems. In one embodiment, referring back to FIG. 7B, the selected modulation and coding rate for a predetermined number of subsequent, sequentially transmitted packets can be provided in the data field 703 of the packet. Therefore, it should be appreciated that the invention should not be construed as limited by such embodiments, but rather construed according to the below claims.

The invention claimed is:

1. A wireless device comprising:
   first and second antennas;
   first and second transceivers; and
   switches to configure the first and second transceivers for non-contiguous frequency operation in a first state, and to configure the first and second transceivers for multiple-input multiple-output (MIMO) operation in a second state, wherein:
      in the first state, the switches are to couple each of the first and second transceivers to the first antenna and to configure the first and second transceivers for different frequencies of operation; and
      in the second state, the switches are to couple the first and second transceivers to the first and second antennas, respectively, and to configure the first and second transceivers for the same frequency of operation.

2. The wireless device of claim 1, further comprising:
   a first synthesizer configured for a first frequency of operation; and
   a second synthesizer configured for a second frequency of operation, wherein the switches are to selectively couple the first synthesizer to each of the first and second transceivers when configured in the second state, and wherein the switches are to selectively couple the first synthesizer to the first transceiver and the second synthesizer to the second transceiver when configured in the first state.

3. The wireless device of claim 2, wherein the first transceiver includes a first set of mixers and the second transceiver includes a second set of mixers, wherein the switches include a first switch that couples the first and second sets of mixers to the first synthesizer when configured in the second state, and wherein the first switch couples the first set of mixers to the first synthesizer and couples the second set of mixers to the second synthesizer when configured in the first state.

4. The wireless device of claim 3, wherein the first set of mixers includes a first mixer in a transmit path of the first transceiver and a second mixer in a receive path of the first transceiver, and the second set of mixers includes a third mixer in a transmit path of the second transceiver and a fourth mixer in a receive path of the second transceiver.

5. The wireless device of claim 2, wherein the first and second synthesizers have correlated phases and phase noise.

6. The wireless device of claim 1, wherein the first transceiver includes a first transmit path, and the second transceiver includes a second transmit path, wherein the switches are to couple the first transmit path and the second transmit path such that outputs of the first transmit path and the second transmit path are summed and provided to the first antenna when the switches are configured in the first state, and wherein the switches are to couple an output of the first transmit path to the first antenna and an output of the second transmit path to the second antenna when configured in the second state.

7. The wireless device of claim 6, wherein the first transmit path includes a first power amplifier and the second transmit path includes a second power amplifier, wherein outputs of the first and second power amplifiers are summed and provided to the first antenna when the switches are configured in the first state, and wherein outputs of the first power amplifier are provided to the first antenna and outputs of the second power amplifier are provided to the second antenna when the switches are configured in the second state.

8. The wireless device of claim 1, wherein the first transceiver includes a first receive path and the second transceiver includes a second receive path, wherein the switches are to couple the first receive path and the second receive path to a first low noise amplifier when configured in the first state, and wherein the switches are to couple the first receive path to the first low noise amplifier and to couple the second receive path to a second low noise amplifier when configured in the second state.

9. A method of transmitting a packet from a transmitter to a receiver, the transmitter configured for at least non-contiguous frequency operation and the receiver configured for only contiguous frequency operation, the method comprising:
configuring a first portion of a waveform to be transmitted, using a first synthesizer, on a first frequency segment of a non-contiguous frequency spectrum;
configuring a second portion of the waveform to be transmitted, using a second synthesizer, on a second frequency segment of the non-contiguous frequency spectrum, wherein the first and second frequency segments are adjacent to one another;
correlating a phase of the first synthesizer with a phase of the second synthesizer such that the first and second portions of the waveform are configured for reception in a single contiguous frequency spectrum; and
transmitting the first and second portions of the waveform to the receiver using the first and second synthesizers.

10. The method of claim 9, further comprising:
applying different modulation and coding schemes to different ones of the first and second frequency segments.

11. The method of claim 9, further comprising configuring the transmitter for multiple-input multiple-output (MIMO) operation.

12. The method of claim 9, wherein each of the first and second frequency segments has a bandwidth of 80 MHz.

13. The method of claim 9, further comprising transmitting a bitmap that indicates use of the non-contiguous frequency spectrum.

14. The method of claim 9, wherein each of the first and second synthesizers is associated with a respective one of the first and second frequency segments.

15. The method of claim 9, wherein each of the first and second frequency segments has a respective carrier provided by one of the first and second synthesizers.

16. The method of claim 9, wherein the receiver receives the waveform as a continuous frequency signal.

17. A transmitter for wirelessly transmitting a packet to a receiver, the transmitter configured for at least non-contiguous frequency operation and the receiver configured for only contiguous frequency operation, the transmitter comprising:
means for configuring a first portion of a waveform to be transmitted, using a first synthesizer, on a first frequency segment of a non-contiguous frequency spectrum;
means for configuring a second portion of the waveform to be transmitted, using a second synthesizer, on a second frequency segment of the non-contiguous spectrum, wherein the first and second frequency segments are adjacent to one another;
means for correlating a phase of the first synthesizer with a phase of the second synthesizer such that the first and second portions of the waveform are configured for reception in a single contiguous frequency spectrum; and
means for transmitting the first and second portions of the waveform to the receiver using the first and second synthesizers.

18. The transmitter of claim 17, further comprising means for applying different modulation and coding schemes to different ones of the first and second frequency segments.

19. The transmitter of claim 17, further comprising means for configuring the transmitter for multiple-input multiple-output (MIMO) operation.

20. The transmitter of claim 17, wherein each of the first and second frequency segments has a bandwidth of 80 MHz.

21. The transmitter of claim 17, further comprising means for transmitting a bitmap that indicates use of the non-contiguous frequency spectrum.

22. The transmitter of claim 17, wherein each of the first and second synthesizers is associated with a respective one of the first and second frequency segments.

23. The transmitter of claim 17, wherein each of the first and second frequency segments has a respective carrier provided by one of the first and second synthesizers.

24. A wireless device comprising:
first and second antennas;
a first transmitter path;
a second transmitter path; and
switches to configure the first and second transmitter paths for non-contiguous frequency operation in a first state, and to configure the first and second transmitter paths for multiple-input multiple-output (MIMO) operation in a second state, wherein:
in the first state, the switches are to couple each of the first and second transmitter paths to the first antenna and to configure the first and second transmitter paths for different frequencies of operation; and
in the second state, the switches are to couple the first and second transmitter paths to the first and second antennas, respectively, and to configure the first and second transmitter paths for the same frequency of operation.

25. The wireless device of claim 24, further comprising:
a first synthesizer configured for a first frequency of operation; and
a second synthesizer configured for a second frequency of operation, wherein the switches are to selectively couple the first synthesizer to each of the first and second transmitter paths when configured in the second state, and wherein the switches are to selectively couple the first synthesizer to the first transmitter path and the second synthesizer to the second transmitter path when configured in the first state.

26. The wireless device of claim 25, wherein the first transmitter path includes a first mixer and the second transmitter path includes a second mixer, wherein the switches include a first switch that couples the first and second mixers to the first synthesizer when configured in the second state, and wherein the first switch couples the first mixer to the first synthesizer and couples the second mixer to the second synthesizer when configured in the first state.

27. The wireless device of claim 26, wherein the first transmit path further includes a first digital-to- analog converter (DAC), a first filter, and a first power amplifier, and the second transmit path further includes a second DAC, a second filter, and a second power amplifier.

28. The wireless device of claim 25, wherein the first and second synthesizers have correlated phases and phase noise.

29. The wireless device of claim 24, wherein the switches are to couple the first transmit path and the second transmit path to an adder such that outputs of the first transmit path and the second transmit path are summed and provided to the first antenna when the switches are configured in the first state, and wherein the switches are to couple an output of the first transmit path to the first antenna and an output of the second transmit path to the second antenna when configured in the second state.

30. The wireless device of claim 29, wherein the first transmit path includes a first power amplifier and the second transmit path includes a second power amplifier, wherein outputs of the first and second power amplifiers are summed and provided to the first antenna when the switches are configured in the first state, and wherein an output of the first power amplifier is provided to the first antenna and an output of the second power amplifier is provided to the second antenna when the switches are configured in the second state.

31. A method of operating a wireless device including a first transmitter path and a second transmitter path, the method comprising:
configuring the first and second transmitter paths for non-contiguous frequency operation in a first state by coupling each of the first and second transmitter paths to a first antenna and configuring the first and second transmitter paths for different frequencies of operation; and
configuring the first and second transmitter paths for multiple-input multiple-output (MIMO) operation in a second state by coupling the first and second transmitter paths to the first antenna and a second antenna, respectively, and configuring the first and second transmitter paths for the same frequency of operation.

32. The method of claim 31, further comprising:
selectively coupling a first synthesizer, configured for a first frequency of operation, to each of the first and second transmitter paths in the second state; and
selectively coupling the first synthesizer to the first transmitter path and a second synthesizer, configured for a second frequency of operation, to the second transmitter path in the first state.

33. The method of claim 32, further comprising:
coupling a first mixer of the first transmitter path and a second mixer of the second transmitter path to the first synthesizer in the second state; and
coupling the first mixer to the first synthesizer and coupling the second mixer to the second synthesizer in the first state.

34. The method of claim 32, further comprising correlating phases and phase noise of the first and second synthesizers.

35. The method of claim 31, further comprising:
coupling the first transmit path and the second transmit path to an adder, in the first state, such that outputs of the first transmit path and the second transmit path are summed and provided to the first antenna; and
coupling an output of the first transmit path to the first antenna and coupling an output of the second transmit path to the second antenna in the second state.

36. A wireless device comprising:
first and second antennas;
a first transmitter path;
a second transmitter path; and
means for configuring the first and second transmitter paths for non-contiguous frequency operation in a first state, and configuring the first and second transmitter paths for multiple-input multiple-output (MIMO) operation in a second state, by:
in the first state, coupling each of the first and second transmitter paths to a first antenna and configuring the first and second transmitter paths for different frequencies of operation; and
in the second state, coupling the first and second transmitter paths to the first and second antennas, respectively, and configuring the first and second transmitter paths for the same frequency of operation.

37. The wireless device of claim 36, further comprising:
means for selectively coupling a first synthesizer, configured for a first frequency of operation, to each of the first and second transmitter paths in the second state; and
means for selectively coupling the first synthesizer to the first transmitter path and a second synthesizer, configured for a second frequency of operation, to the second transmitter path in the first state.

38. The wireless device of claim 37, further comprising:
means for coupling a first mixer of the first transmitter path and a second mixer of the second transmitter path to the first synthesizer in the second state; and
means for coupling the first mixer to the first synthesizer and coupling the second mixer to the second synthesizer in the first state.

39. The wireless device of claim 37, further comprising means for correlating phases and phase noise of the first and second synthesizers.

40. The wireless device of claim 36, further comprising:
means for coupling the first transmit path and the second transmit path to an adder, in the first state, such that outputs of the first transmit path and the second transmit path are summed and provided to the first antenna; and means for coupling an output of the first transmit path to the first antenna and coupling an output of the second transmit path to the second antenna in the second state.

\* \* \* \* \*